(12) United States Patent
Wang et al.

(10) Patent No.: US 12,212,915 B2
(45) Date of Patent: Jan. 28, 2025

(54) HAPTIC SENSING DEVICE, ELECTRONIC DEVICE, EARPHONE, AND WATCH

(71) Applicant: HUAWEI TECHNOLOGIES CO., LTD., Guangdong (CN)

(72) Inventors: Stephen Lingfeng Wang, Cambridge (GB); Hongbin Liu, London (GB); Jian Hu, London (GB); Federica De Chiara, London (GB); Gang Ni, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/083,316

(22) Filed: Dec. 16, 2022

(65) Prior Publication Data

US 2023/0124841 A1    Apr. 20, 2023

Related U.S. Application Data

(63) Continuation of application No. PCT/CN2020/097162, filed on Jun. 19, 2020.

(51) Int. Cl.
*H04R 1/10*    (2006.01)
*G01L 1/24*    (2006.01)
(Continued)

(52) U.S. Cl.
CPC ............ *H04R 1/1041* (2013.01); *G01L 1/24* (2013.01); *G06F 3/0304* (2013.01); *G06F 3/0414* (2013.01)

(58) Field of Classification Search
CPC ......... G01L 1/24; G01L 1/248; G01L 9/0032; G01L 11/02; G06F 3/03; G06F 3/0304;
(Continued)

(56) References Cited

U.S. PATENT DOCUMENTS

| 5,222,165 A | 6/1993 | Bohlinger |
| 6,677,576 B1 | 1/2004 | Kenny et al. |

(Continued)

FOREIGN PATENT DOCUMENTS

| CN | 103968980 B | 2/2016 |
| CN | 110031139 A | 7/2019 |

(Continued)

OTHER PUBLICATIONS

Li Xian et al., Opto-Fluidic Tactile Sensor Array by Laser Direct Writing, 2012, 6 pages.

(Continued)

*Primary Examiner* — Harry S Hong

(57) ABSTRACT

A haptic sensing device, including a light source, an optical waveguide, a photoelectric sensor, and a housing. The optical waveguide includes a waveguide layer and a cladding, the cladding encloses the waveguide layer, and a refractive index of the waveguide layer is greater than a refractive index of the cladding. The waveguide layer includes a plurality of paths, the light source is disposed at an input end of each path, and the photoelectric sensor is disposed at an output end of each path. The light source, the optical waveguide, and the photoelectric sensor are accommodated in the housing. A plurality of contacts are distributed on the housing. When a contact is pressed, the contact is in contact with one path, and the path is deformed. When any two contacts are pressed, the two contacts are in contact with different paths.

20 Claims, 16 Drawing Sheets

(51) Int. Cl.
*G06F 3/03* (2006.01)
*G06F 3/041* (2006.01)

(58) Field of Classification Search
CPC ......... G06F 3/041; G06F 3/0414; H04R 1/10; H04R 1/1041
USPC .......................................... 381/74, 309, 370
See application file for complete search history.

(56) References Cited

U.S. PATENT DOCUMENTS

| | | | |
|---|---|---|---|
| 8,316,719 | B2 | 11/2012 | Majidi et al. |
| 9,534,969 | B1 | 1/2017 | Hunt et al. |
| 10,365,172 | B2 | 7/2019 | Tomita et al. |
| 2009/0033637 | A1* | 2/2009 | Han ...................... G06F 3/0421 178/18.09 |
| 2009/0153519 | A1* | 6/2009 | Suarez Rovere ....... G06F 3/041 345/173 |
| 2009/0174683 | A1 | 7/2009 | Juni et al. |
| 2010/0302210 | A1* | 12/2010 | Han ........................ G06F 3/042 345/175 |
| 2011/0206838 | A1 | 8/2011 | Juni et al. |
| 2012/0268427 | A1* | 10/2012 | Slobodin ................. G06F 3/042 345/175 |
| 2012/0318074 | A1 | 12/2012 | Kyung et al. |
| 2013/0220032 | A1* | 8/2013 | Packirisamy .......... G01D 5/353 73/862.624 |
| 2013/0324860 | A1 | 12/2013 | Borgos et al. |
| 2014/0098058 | A1 | 4/2014 | Baharav et al. |
| 2017/0255337 | A1 | 9/2017 | Drumm |
| 2017/0372114 | A1* | 12/2017 | Cho .................... G06V 40/1318 |
| 2018/0356301 | A1 | 12/2018 | Tomita et al. |

FOREIGN PATENT DOCUMENTS

| | | |
|---|---|---|
| CN | 110333008 A | 10/2019 |
| CN | 111157154 A | 5/2020 |
| EP | 0377549 A2 | 7/1990 |
| JP | 2003156643 A | 5/2003 |
| KR | 20130086909 A | 8/2013 |
| WO | 2019173827 A1 | 9/2019 |

OTHER PUBLICATIONS

Lee, H.K., Chang, S.I. and Yoon, E., 2006. A flexible polymer tactile sensor: Fabrication and modular expandability for large area deployment. Journal of microelectromechanical systems, 15(6), pp. 1681-1686.

Liu, W., Yu, P., Gu, C., Cheng, X. and Fu, X., 2017. Fingertip piezoelectric tactile sensor array for roughness encoding under varying scanning velocity. IEEE Sensors Journal, 17(21), pp. 6867-6879.

Liao Yanbiao. Fiber OptiesIM],2000, 9 pages.

Piacenza, P., Xiao, Y., Park, S., Kymissis, I. and Ciocarlie, M., Oct. 2016. Contact localization through spatially overlapping piezoresistive signals. In 2016 IEEE/RSJ International Conference on Intelligent Robots and Systems (IROS) (pp. 195-201). IEEE.

Watatani, K., Terao, K., Shimokawa, F. and Takao, H., Jan. 2019. A Monolithic Fingerprint-Like Tactile Sensor Array Realizaing High Resolution Imaging of Spatially Distributed Tactile Information. In 2019 IEEE 32nd International Conference on Micro Electro Mechanical Systems (MEMS) (pp. 182-185). IEEE.

Chen, Y., Liu, Y., Ren, J., Yang, W., Shang, E., Ma, K., Zhang, L., Jiang, J. and Sun, X., 2020. Conformable core-shell fiber tactile sensor by continuous tubular deposition modeling with water-based sacrificial coaxial writing. Materials and Design, 190, p. 108567.

Wang, Y., Wu, X., Mei, D., Zhu, L. and Chen, J., 2019. Flexible tactile sensor array for distributed tactile sensing and slip detection in robotic hand grasping. Sensors and Actuators A: Physical, 297, p. 111512.

Saadatzi, M.N., Baptist, J.R., Yang, Z. and Popa, D.O., 2019. Modeling and Fabrication of Scalable Tactile Sensor Arrays for Flexible Robot Skins. IEEE Sensors Journal, 19(17), pp. 7632-7643.

Hammond, F.L., Kramer, R.K., Wan, Q., Howe, R.D. and Wood, R.J., Oct. 2012. Soft tactile sensor arrays for micromanipulation. In 2012 IEEE/RSJ International Conference on Intelligent Robots and Systems (pp. 25-32). IEEE.

Li, T., Shi, C. and Ren, H., 2018. A high-sensitivity tactile sensor array based on fiber Bragg grating sensing for tissue palpation in minimally invasive surgery. IEEE/ASME Transactions on Mechatronics, 23(5), pp. 2306-2315.

Ward-Cherrier, B., Rojas, N. and Lepora, N.F., 2017. Model-free precise in-hand manipulation with a 3d-printed tactile gripper. IEEE Robotics and Automation Letters, 2(4), pp. 2056-2063.

Massaro, A., Spano, F., Cazzato, P., La Tegola, C., Cingolani, R. and Athanassiou, A., 2012. Robot tactile sensing: Gold nanocomposites as highly sensitive real-time optical pressure sensors. IEEE Robotics and Automation Magazine, 20(2), pp. 82-90.

Back, J., Dasgupta, P., Seneviratne, L., Althoefer, K. and Liu, H., Sep. 2015. Feasibility study-novel optical soft tactile array sensing for minimally invasive surgery. In 2015 IEEE/RSJ International Conference on Intelligent Robots and Systems (IROS) (pp. 1528-1533). IEEE.

Li, W., Konstantinova, J., Noh, Y., Ma, Z., Alomainy, A. and Althoefer, K., 2019. An elastomer-based force and tactile sensor.

Yuan, W., Zhu, C., Owens, A., Srinivasan, M.A. and Adelson, E.H., May 2017. Shape-independent hardness Estimation using deep learning and a gelsight tactile sensor. In 2017 IEEE International Conference on Robotics and Automation (ICRA) (pp. 951-958). IEEE.

\* cited by examiner

HAPTIC SENSING DEVICE, ELECTRONIC DEVICE, EARPHONE, AND WATCH

CROSS-REFERENCE TO RELATED APPLICATIONS

This application is a continuation of International Application No. PCT/CN2020/097162, filed on Jun. 19, 2020, the disclosure of which is hereby incorporated by reference in its entirety.

TECHNICAL FIELD

This application relates to the field of sensor design, and in particular, to a haptic sensing device, an electronic device, an earphone, and a watch.

BACKGROUND

With the development of science and technology, intelligent machinery gradually replaces humans to perform precise operations in many fields. Precise haptic information plays an extremely important role in implementing an overall function of the intelligent machinery. A haptic sensor can restore haptic information to a large extent, thereby improving decision-making efficiency of an entire system, and ensuring an orderly and secure interaction process.

Currently, the haptic sensor may usually include a capacitive haptic array sensor, an inductive haptic sensor, a piezoresistive haptic sensor, a piezoelectric haptic sensor, and the like. However, these haptic sensors have complex cabling, limited working scenarios, and insufficient adaptation capabilities, and consequently are difficult to integrate in high density. Therefore, how to sense pressure at a plurality of points to provide a reliable data basis for completing a precise operation is urgently to be resolved.

SUMMARY

Embodiments of this application provide a haptic sensing device, to sense pressure at a plurality of points, thereby providing a reliable data basis for completing a precise operation.

To achieve the foregoing objective, embodiments of this application provide the following technical solutions.

A first aspect of this application provides a haptic sensing device, which may include a light source, an optical waveguide, a photoelectric sensor, and a housing. The optical waveguide may include a waveguide layer and a cladding, the cladding encloses the waveguide layer, and a refractive index of the waveguide layer is greater than a refractive index of the cladding. This is to ensure that transmission, in the waveguide layer, of an optical signal emitted by the light source meets a condition for total internal reflection. The waveguide layer may include a plurality of paths, the light source is disposed at an input end of each path, and the photoelectric sensor is disposed at an output end of each path. The optical signal emitted by the light source is transmitted to the photoelectric sensor by using the plurality of paths. The light source, the optical waveguide, and the photoelectric sensor are accommodated in the housing. A plurality of contacts are distributed on the housing, and each contact may include at least two forms. When the contact is in a first form, the contact is not in contact with the path. When the contact is in a second form, the contact is in contact with one path, and any two contacts are in contact with different paths when the two contacts both are in the second form. A form of the contact is related to a pressure degree of contact force. When there is no contact force on the contact, the contact is in the first form. When there is contact force on the contact, the contact is in the second form. Each of the plurality of paths corresponds to a contact. When a contact is pressed, the contact is in contact with only one path, and another path is not affected. When a contact is pressed, the contact is in contact with one path, and the path is deformed. When the path is deformed, the path no longer meets the condition for total internal reflection, that is, an optical signal transmitted on the path has a loss. When a pressure degree of contact force applied to the contact is larger, deformation of the path is larger under action of the contact, and the loss of the optical signal transmitted on the path is larger. The photoelectric sensor obtains, in real time, the optical signal transmitted on the path, and the optical signal obtained by the photoelectric sensor is used to determine a pressure degree of contact force. It may be learned from the first aspect that when a path is bent, the condition for total internal reflection of the path is damaged, the optical signal generated on the path has a loss, and the optical signal obtained by the photoelectric sensor disposed at the output end of the path changes. Specifically: intensity of the optical signal obtained by the photoelectric sensor disposed at the output end of the path weakens. It may be learned from the solution provided in the first aspect that the paths are in a one-to-one correspondence with the contacts, for example, a contact A corresponds to a path A, a contact B corresponds to a path B, and a contact C corresponds to a path C. When a photoelectric sensor at an output end of the path A detects a loss of an optical signal, it may be determined that the contact A is pressed. When photoelectric sensors at output ends of the path A and the path B both detect a loss of an optical signal, it may be determined that the contact A and the contact B are pressed. For another example, when photoelectric sensors at output ends of the path A, the path B, and the path C successively detect a loss of an optical signal, it may be determined that there is sliding force, where a direction is from the contact A to the contact C or the direction is from the contact C to the contact A. According to the solution provided in this application, because a location of the contact is preset, and the contacts are in a one-to-one correspondence with the paths, the photoelectric sensor disposed at the output end of the path may learn of an intensity change of the optical signal on each path, to sense pressure at a plurality of points, thereby providing a reliable data basis for completing a precise operation.

Optionally, with reference to the first aspect, in a first possible implementation, at least two of the plurality of paths have a same input end, and one light source is disposed at the input end for the at least two paths. It may be learned from the first possible implementation of the first aspect that, a specific structure of the waveguide layer is provided. The plurality of paths in the structure of the waveguide layer in the haptic sensing device provided in this application may be in a multiple-input multiple-output structure.

Optionally, with reference to the first possible implementation of the first aspect, in a second possible implementation, the plurality of paths are a single-input multiple-output SIMO structure, and one light source is disposed at an input end for the plurality of paths. It may be learned from the second possible implementation of the first aspect that, a specific structure of the waveguide layer is provided. The plurality of paths in the structure of the waveguide layer in the haptic sensing device provided in this application may be in the SIMO structure. In this single-input multiple-output structure, only one light source needs to be disposed, and components are reduced. In addition, the structure is more compact, and space is saved.

Optionally, with reference to the second possible implementation of the first aspect, in a third possible implementation, the plurality of paths are in a tree-like structure. The input end for the plurality of paths is a root node of the tree-like structure, and the output end of each path is a leaf node of the tree-like structure. A first path may include a trunk part and a branch part, and the first path is any of the plurality of paths. The trunk part is a part that is of the first path and that overlaps a path other than the first path in the plurality of paths, and the branch part is a part that is of the first path and that does not overlap a path other than the first path in the plurality of paths. When the contact is in the second form, the contact is in contact with a branch part of one path. It may be learned from the third possible implementation of the first aspect that the plurality of paths in the structure of the waveguide layer may be in the tree-like structure. Compared with another SIMO structure, the tree-like structure for the plurality of paths is more compact, and can also better save space. In addition, in the tree-like structure provided in this application, a thickness of each path is adjustable, and curvature of each path is also adjustable. The curvature of each path may be adjusted, so that the haptic sensor provided in this application may be disposed on any three-dimensional small curved surface. In addition, in the solution provided in this application, the thickness of each path, that is, a diameter of each path, may also be adjusted. The curvature determines a macro-bending loss of the path, and a larger macro-bending loss indicates a larger loss of the optical signal transmitted on the path, which is not helpful for the photoelectric sensor disposed at the output end of the path to detect the optical signal. Therefore, the diameter of the path may be adjusted at a location at which the macro-bending loss is excessively large. A larger diameter indicates better light transmittance of the path, which is helpful for the photoelectric sensor disposed at the output end of the path to detect the optical signal.

Optionally, with reference to the first possible implementation of the first aspect to the third possible implementation of the first aspect, in a fourth possible implementation, a refractive index of the housing ranges from 1.35 to 1.38.

Optionally, with reference to the fourth possible implementation of the first aspect, in a fifth possible implementation, a material of the housing is polytetrafluoroethylene PTFE.

Optionally, with reference to the first possible implementation of the first aspect to the fifth possible implementation of the first aspect, in a sixth possible implementation, when the housing is the cladding and the contact is in the second form, the contact is directly in contact with one path. It may be learned from the sixth possible implementation of the first aspect that in the solution provided in this application, a thinner haptic sensor may be manufactured by replacing a structure of the cladding of the optical waveguide with the housing.

Optionally, with reference to the sixth possible implementation of the first aspect, in a seventh possible implementation, the waveguide layer may include a plurality of paths and a first medium, each of the plurality of paths is filled with the first medium, and a refractive index of the first medium is greater than the refractive index of the housing. A plurality of contacts are distributed on a first surface of the housing, a plurality of paths are distributed on a second surface of the housing, and the first surface and the second surface are two surfaces of the housing that are opposite to each other.

Optionally, with reference to the first possible implementation of the first aspect to the fifth possible implementation of the first aspect, in an eighth possible implementation, when the housing and the cladding are different structures and the contact is in the second form, the contact is indirectly in contact with one path by using the cladding.

Optionally, with reference to the first possible implementation of the first aspect to the eighth possible implementation of the first aspect, in a ninth possible implementation, a contour of the contact is fixed.

Optionally, with reference to the ninth possible implementation of the first aspect, in a tenth possible implementation, the contact is hollow or non-hollow, and an opaque flexible material is filled into a hollow place of the hollow contact.

Optionally, with reference to the ninth possible implementation of the first aspect, in an eleventh possible implementation, a shape of the contact may include one or more of a cantilever shape, a spiral shape, and a cross shape.

Optionally, with reference to the first possible implementation of the first aspect to the eleventh possible implementation of the first aspect, in a twelfth possible implementation, a thickness of the contact is not greater than 0.5 mm.

Optionally, with reference to the first possible implementation of the first aspect to the twelfth possible implementation of the first aspect, in a thirteenth possible implementation, the photoelectric sensor is a photodiode.

Optionally, with reference to the first possible implementation of the first aspect to the thirteenth possible implementation of the first aspect, in a fourteenth possible implementation, the light source is a light-emitting diode or infrared light.

Optionally, with reference to the first possible implementation of the first aspect to the fourteenth possible implementation of the first aspect, in a fifteenth possible implementation, an angle of incidence of the optical signal is 0°.

Optionally, with reference to the first possible implementation of the first aspect to the fifteenth possible implementation of the first aspect, in a sixteenth possible implementation, when the contact is in the first form, a deviation between macro-bending losses of any two paths falls within a preset range.

Optionally, with reference to the first possible implementation of the first aspect to the sixteenth possible implementation of the first aspect, in a seventeenth possible implementation, curvature of the path is positively related to a diameter of the path. It may be learned from the seventeenth possible implementation of the first aspect that larger curvature of the path indicates a larger diameter of the path, and that smaller curvature of the path indicates a smaller diameter of the path. The curvature of the path may change, so that the solution provided in this application may be disposed on any three-dimensional small curved surface, that is, the curvature of the path may be designed based on curvature of the small curved surface. In addition, in the solution provided in this application, the curvature of the path is positively related to the diameter of the path. For a location at which the curvature of the path is larger, a macro-bending loss at the location is larger. To reduce impact of the macro-bending loss, the diameter of the corresponding path at the location may be increased, to ensure that an optical signal with sufficient light intensity can also pass through the location at which the macro-bending loss is large, which is helpful for the photoelectric sensor disposed at the output end of the path to detect the optical signal.

A second aspect of this application provides a haptic sensing device, which may include a light source, a first medium, a photoelectric sensor, and a housing. A plurality of paths are distributed on one side of the housing, each of the plurality of paths is filled with the first medium, and curvature of the path is negatively related to a diameter of the path. A plurality of contacts are distributed on the other side of the housing, and each contact includes at least two forms. When the contact is in a first form, the contact is not in contact with the path. When the contact is in a second form, the contact is in contact with one path, and any two contacts are in contact with different paths when the two contacts both are in the second form. A form of the contact is related to a pressure degree of contact force. A refractive index of the first medium is less than a refractive index of the housing. The light source is disposed at an input end of each path, and the photoelectric sensor is disposed at an output end of each path. An optical signal emitted by the light source is transmitted to the photoelectric sensor by using the plurality of paths. The photoelectric sensor obtains, in real time, the optical signal transmitted on the path, and the optical signal obtained by the photoelectric sensor is used to determine a pressure degree of contact force.

Optionally, with reference to the second aspect, in a first possible implementation, at least two of the plurality of paths have a same input end, and one light source is disposed at the input end for the at least two paths.

Optionally, with reference to the first possible implementation of the second aspect, in a second possible implementation, the plurality of paths are a single-input multiple-output SIMO structure, and one light source is disposed at an input end for the plurality of paths.

Optionally, with reference to the second possible implementation of the second aspect, in a third possible implementation, the plurality of paths are in a tree-like structure. The input end for the plurality of paths is a root node of the tree-like structure, and the output end of each path is a leaf node of the tree-like structure. A first path may include a trunk part and a branch part, and the first path is any of the plurality of paths. The trunk part is a part that is of the first path and that overlaps a path other than the first path in the plurality of paths, and the branch part is a part that is of the first path and that does not overlap a path other than the first path in the plurality of paths. When the contact is in the second form, the contact is in contact with a branch part of one path.

Optionally, with reference to the first possible implementation of the second aspect to the third possible implementation of the second aspect, in a fourth possible implementation, the refractive index of the housing ranges from 1.35 to 1.38.

Optionally, with reference to the fourth possible implementation of the second aspect, in a fifth possible implementation, a material of the housing is polytetrafluoroethylene PTFE.

Optionally, with reference to the first possible implementation of the second aspect to the fifth possible implementation of the second aspect, in a sixth possible implementation, a contour of the contact is fixed.

Optionally, with reference to the sixth possible implementation of the second aspect, in a seventh possible implementation, the contact is hollow or non-hollow, and an opaque flexible material is filled into a hollow place of the hollow contact.

Optionally, with reference to the sixth possible implementation of the second aspect, in an eighth possible implementation, a shape of the contact may include one or more of a cantilever shape, a spiral shape, and a cross shape.

Optionally, with reference to the first possible implementation of the second aspect to the sixth possible implementation of the second aspect, in a ninth possible implementation, a thickness of the contact is not greater than 0.5 mm.

Optionally, with reference to the first possible implementation of the second aspect to the ninth possible implementation of the second aspect, in a tenth possible implementation, the photoelectric sensor is a photodiode.

Optionally, with reference to the first possible implementation of the second aspect to the tenth possible implementation of the second aspect, in an eleventh possible implementation, the light source is a light-emitting diode or infrared light.

Optionally, with reference to the first possible implementation of the second aspect to the eleventh possible implementation of the second aspect, in a twelfth possible implementation, an angle of incidence of the optical signal is 0°.

Optionally, with reference to the first possible implementation of the second aspect to the twelfth possible implementation of the second aspect, in a thirteenth possible implementation, when the contact is in the first form, a deviation between macro-bending losses of any two paths falls within a preset range.

A third aspect of this application provides an electronic device, and the electronic device may include an enclosure and a haptic sensor. The haptic sensor is the haptic sensor described in the first aspect or any possible implementation of the first aspect, and the enclosure may include the housing. Alternatively, the haptic sensor may be the haptic sensor described in the second aspect or any possible implementation of the second aspect.

Optionally, with reference to the third aspect, in a first possible implementation, the electronic device may further include a memory and a processor, and the memory is coupled to the processor. The memory pre-stores a correspondence between a pressure degree and an instruction, and the processor determines the instruction based on the correspondence and a pressure degree that is of contact force and that is determined by the photoelectric sensor.

A fourth aspect of this application provides an earphone, and the earphone may include an enclosure and a haptic sensor. The haptic sensor is the haptic sensor described in the first aspect or any possible implementation of the first aspect, and the enclosure may include the housing. Alternatively: the haptic sensor may be the haptic sensor described in the second aspect or any possible implementation of the second aspect.

Optionally, with reference to the fourth aspect, in a first possible implementation, the earphone may further include a memory and a processor, the memory is coupled to the processor, and the memory and the processor are disposed inside the enclosure. The memory pre-stores a correspondence between a pressure degree and an instruction, and the processor determines the instruction based on the correspondence and a pressure degree that is of contact force and that is determined by the photoelectric sensor.

A fifth aspect of this application provides a watch, and the watch may include a watch face and a haptic sensor. The haptic sensor is the haptic sensor described in the first aspect or any possible implementation of the first aspect, and the watch face may include the housing. Alternatively, the haptic sensor may be the haptic sensor described in the second aspect or any possible implementation of the second aspect.

Optionally, with reference to the fifth aspect, in a first possible implementation, the watch may further include a memory and a processor, and the memory is coupled to the processor. The memory pre-stores a correspondence between a pressure degree and an instruction, and the processor determines the instruction based on the correspondence and a pressure degree that is of contact force and that is determined by the photoelectric sensor.

A sixth aspect of this application provides a detection method. The detection method is applied to the haptic sensor described in the first aspect or any possible implementation of the first aspect or is applied to the haptic sensor described in the second aspect or any possible implementation of the second aspect, and may include: obtaining, in real time by using a photoelectric sensor disposed at an output end of each path, an optical signal transmitted on the path, where intensity of the optical signal obtained by the photoelectric sensor is related to a pressure degree of contact force; and determining, when a first photoelectric sensor disposed at an output end of a first path detects that intensity of an optical signal transmitted on the first path changes, that a contact corresponding to the first path is in a second form, where the first path includes at least one path.

Optionally, with reference to the sixth aspect, in a first possible implementation, the method further includes: determining the pressure degree of the contact force based on a pre-stipulated correspondence between intensity of an optical signal and contact force.

Optionally, with reference to the sixth aspect or the first possible implementation of the sixth aspect, in a second possible implementation, the determining, when a first photoelectric sensor disposed at an output end of a first path detects that intensity of an optical signal transmitted on the first path changes, that a contact corresponding to the first path is in a second form includes: when at least two neighboring photoelectric sensors in the photoelectric sensor successively detect that the intensity of the optical signal changes, determining that at least two contacts in the first path are successively in the second form. It may be learned from the second possible implementation of the sixth aspect that in the solution provided in this application, when intensity of optical signals transmitted on at least two neighboring paths in the paths successively change, where the two neighboring paths include a first path and a second path, it is determined that contact force slides in a direction from the first path to the second path or that the contact force slides in a direction from the second path to the first path. In other words, the solution provided in this application may be used to detect sliding contact force.

According to the technical solutions provided in this application, the contacts distributed on the housing of the haptic sensing device are in a one-to-one correspondence with the plurality of paths included in the waveguide layer of the haptic sensing device. The photoelectric sensor disposed at the output end of a path detects whether intensity of the optical signal changes, to determine whether a contact corresponding to the path is pressed, and determine a pressure degree of contact force on the contact.

DESCRIPTION OF EMBODIMENTS

Figure 1:
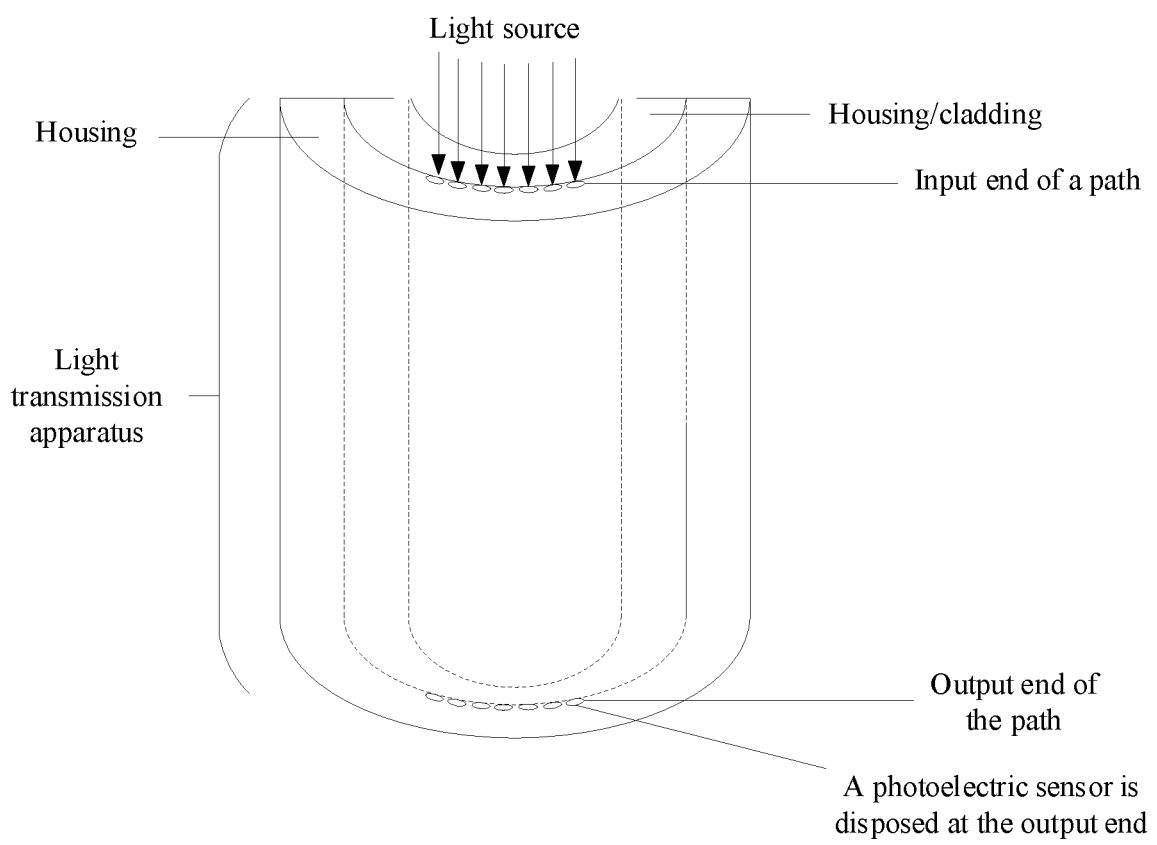
FIG. 1 is a schematic diagram of a structure of a haptic sensing device according to an embodiment of this application.

The following clearly describes the technical solutions in embodiments of this application with reference to accompanying drawings in embodiments of this application. It is clear that the described embodiments are merely some but not all of embodiments of this application.

In the specification, claims, and accompanying drawings of this application, terms "first", "second", "third", "fourth", and the like (if existent) are intended to distinguish between similar objects but do not necessarily indicate a specific order or sequence. It should be understood that the data termed in such a way are interchangeable in an appropriate circumstance, so that the embodiments described herein can be implemented in another order than the order illustrated or described herein. Moreover, terms "include", "comprise", and any other variants mean to cover non-exclusive inclusion, for example, a process, method, system, product, or device that includes a list of steps or units is not necessarily limited to those steps or units, and may include other steps or units not expressly listed or inherent to such a process, method, product, or device.

In the description of this application, unless otherwise explicitly and specifically limited, "a plurality of" means two or more.

In this application, unless otherwise explicitly specified and limited, terms such as "install", "interconnect", "connect", "fix", and "dispose" should be understood broadly, for example, may be a fixed connection, may be a detachable connection, or may be integrated; may be a mechanical connection, or may be an electrical connection; may be a direct connection, may be an indirect connection by using an intermediate medium, or may be an internal connection between two elements or an interaction relationship between the two elements. A person of ordinary skill in the art may interpret specific meanings of the foregoing terms in this application according to specific cases.

Some terms are used in the specification and the claims to refer to specific components. A person skilled in the art should understand that a hardware manufacturer may use different nouns to name a same component. This specification and the subsequent claims are not intended to distinguish between components by using a difference in names, but are intended to distinguish between the components by using a difference in functions. "Include" or "comprise" mentioned in the specification and the claims is an open term, and therefore shall be construed as including but not limited to or comprising but not limited to.

To better understand this application, study ideas of the technical solutions described in this application are specifically described below.

A haptic sensor, also referred to as a haptic sensing array or a haptic sensing device, may include one or more haptic sensing units. The haptic sensing unit can measure contact force at a single point. The haptic sensor may be classified into two types based on a quantity of haptic units: a single-point haptic sensor and a dot-matrix haptic sensor. The dot-matrix haptic sensor integrates a plurality of sensing units, and therefore may detect contact force in more scenarios. Specifically, the dot-matrix haptic sensor may determine a contact area contour through single contact, improve grab stability, and determine a sliding speed, and has higher spatial resolution, and so on. Currently, there are a plurality of methods for implementing haptic sensing. The haptic sensing may be classified into a piezoresistive type, a piezoelectric type, a capacitive type, an optical type, and the like based on a principle of haptic sensing. Several typical haptic sensing principles are separately described below.

A piezoresistive haptic sensor is a device manufactured based on a piezoresistive effect of a semiconductor material. A substrate of the piezoresistive haptic sensor may be directly used as a sensing measurement element, and a diffused resistor is connected inside the substrate in a form of a bridge. When the substrate is deformed under action of external force, each resistance value changes, and the bridge generates corresponding unbalanced output. In other words, resistance of a piezoresistive material changes when external pressure acts on the piezoresistive material, and the external pressure may be measured by detecting a change of the resistance. Therefore, haptic force can be detected by using the piezoresistive material as a press-sensitive material of a haptic sensor. In common manufacturing of the piezoresistive material, a conductive material may be mixed in an insulated high molecular polymer to form a composite material with a pressure-sensitive feature. Conductive materials such as a conductive particle and a conductive nanowire are distributed in an insulated polymer matrix. When the insulated polymer matrix is pressed, a distance between the conductive materials is shortened, and a quantity of conductive paths increases, thereby reducing overall resistance. In addition to a conductive polymer, a metal film with the piezoresistive effect is also used in design and manufacturing of a haptic sensing array. Specifically: the metal film with the piezoresistive effect is used as a pressure-sensitive material of the haptic sensing array.

A potential difference between two ends of a piezoelectric material occurs under action of pressure on a piezoelectric haptic sensor. On the contrary, mechanical stress is generated when voltage is applied. A charge is generated when external pressure acts on the piezoelectric material, and applied external force can be detected by measuring a quantity of generated charges. For example, after being polarized, polyvinylidene fluoride (PVDF) has a piezoelectric feature, and may be used as a pressure-sensitive material of a haptic sensor.

A principle of a capacitive haptic sensor is as follows: External force changes relative displacement between plates, and therefore capacitance changes. Haptic force is measured by detecting a changed amount of the capacitance. A capacitor structure usually includes two capacitor plates and a dielectric layer. Under action of external force, the dielectric layer is compressed, and a distance between the two capacitor plates changes. As a result, a capacitance value changes.

The piezoresistive haptic sensor, the piezoelectric haptic sensor, and the capacitive haptic sensor mentioned above have disadvantages of insufficient electromagnetic resistance and humidity resistance capabilities, zero drift of a signal, complex cabling, difficulty in integration in high density, and the like. For example, a haptic technology using a piezoelectric or piezoresistive principle usually needs to be manufactured through micro-processing of silicon or a thin film process. However, a process procedure of this type of sensor is complex, costs are relatively high, integration and flexibility are affected by a line layout, and utilization of a sensor surface that can feed back haptic information is not high. In addition, in the several sensing technologies mentioned above, a contact can be inlaid on only a plane or a cylindrical surface. As a result, workspace is limited, and an adaptation capability is insufficient. In actual application, there is an increasing requirement for a dot-matrix haptic technology that can be integrated on any three-dimensional small surface. In addition, although there are mature commercial products for conventional pressure sensors, such as a resistor and a capacitor, that can measure, based on an electrical feature change of a material generated when an element is strained, positive pressure that causes micron-level deformation of the element, repeated use is prone to cause stress fatigue, causing distortion of a transmitted signal.

In addition, there is a haptic technology that uses an optical principle. A common method includes the following: A camera is used to collect a deformed image of a flexible material or obtain pressure information by using a light intensity change caused by the flexible material. A disadvantage of this solution is that it is usually difficult to decrease a sensor thickness. Another relatively novel method is using a fiber Bragg grating (FBG). In this solution, a change of a center wavelength of reflected light is used to feed back a change of contact force in real time. However, the fiber Bragg grating is susceptible to temperature, and an algorithm for decoupling contact force and temperature needs to be additionally designed, which increases calculation burden. In addition, this manner has a special requirement on a light source, and a common light source cannot use the fiber Bragg grating. Moreover, in this solution, a macro-bending loss needs to be avoided as far as possible. Actually, the macro-bending loss is avoided as far as possible in most haptic technologies that use the optical principle. However, the solution provided in this application can use the macro-bending loss, so that the solution provided in this application may be disposed on any three-dimensional small curved surface.

There is an optical haptic sensor that includes three parts: a transmit end and a receive end of a light source, and a propagation medium of light. The propagation medium is deformed under action of external force, and therefore a propagation direction and intensity of light change, which affects intensity of an optical signal received at the receive end. The external force may be detected by using a principle that light leakage occurs when light is propagated in a fiber that is bent under force. However, this solution does not have a specific structure solution, and only provides a possibility that pressure can be determined theoretically by using an optical loss. In an actual application process, how to sense pressure at a plurality of points on any complex curved surface is not resolved. Difficulties include but are not limited to the following: When a scenario in which the haptic sensor is disposed is any three-dimensional small curved surface, how to dispose a structure of the haptic sensor to not only prevent an increase in a product thickness, but also implement a function of sensing pressure at a plurality of contacts on the three-dimensional curved surface. When there is a requirement of touching a plurality of points on the three-dimensional small curved surface, how to position a location of each pressure point and a pressure degree. When the plurality of points are simultaneously touched, how the receive end determines each force location and a pressure degree based on intensity of a received optical signal. All these problems are to be considered and resolved. It should be noted that the haptic sensor mentioned in this application may also be referred to as a haptic sensing device.

To resolve the foregoing problems, this application provides a haptic sensing device, including a light source, an optical waveguide, a photoelectric sensor, and a housing.

For how to dispose a structure of the haptic sensor to not only prevent an increase in a product thickness, but also implement a function of sensing pressure at a plurality of contacts on a three-dimensional curved surface, a cladding of the optical waveguide may be replaced with a product enclosure in this application. It is not obviously well-known general knowledge to select a proper material as a cladding of a specific optical waveguide to reduce an optical loss. In the embodiments of this application, a material, polytetrafluoroethylene (PTFE), is determined through a large quantity of experiments. The product enclosure may be manufactured by using this material, and the product enclosure may also be used as a housing of the haptic sensor. In other words, the material selected in this application may be used to save space occupied by the cladding of the optical waveguide, and a structure is simple and thin, which is applicable to outline structures of a plurality of products.

For problems that when there is a requirement of touching a plurality of points on the three-dimensional small curved surface, how to position a location of each pressure point and a pressure degree, and that when the plurality of points are simultaneously touched, how the receive end determines each force location and a pressure degree based on intensity of a received optical signal, a waveguide layer in this solution includes a plurality of paths, the light source is disposed at an input end of each path, and the photoelectric sensor is disposed at an output end of each path, an optical signal emitted by the light source is transmitted to the photoelectric sensor by using the plurality of paths, and a plurality of contacts are distributed on the housing. Each contact includes at least two forms. When the contact is in a first form, the contact is not in contact with the path. When the contact is in a second form, the contact is in contact with one path, and any two contacts are in contact with different paths when the two contacts both are in the second form. A form of the contact is related to a pressure degree of contact force. The photoelectric sensor obtains, in real time, the optical signal transmitted on the path, and converts the collected optical signal into an electrical signal, where the electrical signal is used to determine a pressure degree of contact force. In this design, the waveguide layer includes a plurality of paths, the light source is disposed at the input end of each path, and the photoelectric sensor is disposed at the corresponding output end. A contact is disposed on the housing above each path, and each path corresponds to one contact. The contact may be pressed. When a corresponding contact above a specific path is pressed, a condition for total internal reflection of the path is damaged, and the photoelectric sensor disposed at the output end of the path may calculate, based on an intensity change of the optical signal, external force received by the sensor. This design is used to meet a multi-point touch requirement, thereby precisely positioning each force location and a pressure degree. A diameter of the path is positively related to curvature of the path, and larger curvature of the path indicates a larger optical loss. Therefore, the diameter of the path may be correspondingly increased to increase light transmittance of the path, and compensate for a macro-bending loss. Through this design, the haptic sensor can be arranged on any three-dimensional small curved surface.

Based on the foregoing research approach, the following specifically describes the technical solutions provided in this application.

FIG. 1 is a schematic diagram of a structure of a haptic sensing device according to an embodiment of this application. As shown in FIG. 1, the haptic sensing device provided in this application may include a light source, an optical waveguide, a photoelectric sensor, and a housing.

The optical waveguide includes a waveguide layer and a cladding, the cladding encloses the waveguide layer, and a refractive index of the waveguide layer is greater than a refractive index of the cladding. It should be noted that, that the cladding encloses the waveguide layer in this application is intended to indicate a location relationship between the cladding and the waveguide layer. The optical waveguide includes the waveguide layer and the cladding from the inside to the outside. The cladding may directly enclose the waveguide layer, or the cladding may indirectly enclose the waveguide layer, that is, another material or medium may be further included between the cladding and the waveguide layer. In addition, it should be noted that in this application, the cladding needs to enclose the waveguide layer, so that the optical waveguide meets a condition for total internal reflection.

The optical waveguide provided in this application meets the condition for total internal reflection. A condition for occurrence of total internal reflection is that light enters an optically thin medium from an optically thick medium and that an angle of incidence is greater than or equal to a critical angle. Through comparison between two media, a medium with a larger light speed (a speed of light in the medium) is referred to as the optically thin medium, and a medium with a smaller light speed is referred to as the optically thick medium. Compared with the optically thick medium, the optically thin medium has a larger light speed and a smaller absolute refractive index. A method for calculating the critical angle is C=arcsin (m/n), where m is a refractive index of the housing, and n is the refractive index of the waveguide layer. When an angle of refraction increases to 90°, refractive light is propagated in an interface direction. When the angle of incidence slightly increases, incident light is completely reflected back into the optically thick medium according to a Snell's law. This phenomenon is referred to as total internal reflection. In other words, in this application, an optical signal emitted by the light source is completely reflected back into the waveguide layer according to the Snell's law.

The waveguide layer includes a plurality of paths. The light source is disposed at the input end of each path, and the photoelectric sensor (not shown in the figure) is disposed at the output end of each path. The optical signal emitted by the light source is transmitted to the photoelectric sensor by using the plurality of paths. It should be noted that a quantity of light sources shown in FIG. 1 is a limitation. In some specific implementations, a plurality of light sources may be disposed. For example, when the input ends of all of the plurality of paths included in the waveguide layer are different, one light source is disposed at the input end of each path. A curvature radius of each path should be greater than a critical value, and the critical value is determined based on a macro-bending loss. The macro-bending loss means that when the waveguide layer is bent, if the curvature radius is greater than a critical value, an additional optical loss caused by bending is extremely small and even can be ignored. If the curvature radium is less than the critical value, the additional optical loss increases rapidly according to an exponential rule. In this application, when curvature of each path is designed, the macro-bending loss is considered to ensure that the curvature radius of each path is greater than a critical value. In a specific implementation, all the paths have same curvature, that is, all the paths have a same macro-bending loss. How to enable all the paths to have a same macro-bending loss and a beneficial effect brought by the same macro-bending loss of all the paths are described below.

Figure 2:
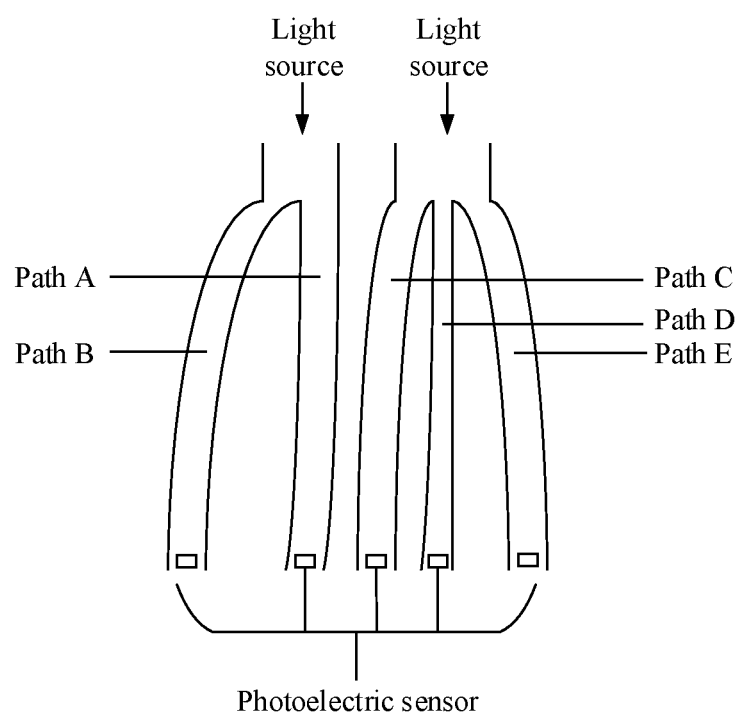
FIG. 2 is a schematic diagram of a structure of a waveguide layer according to an embodiment of this application.
Figure 3:
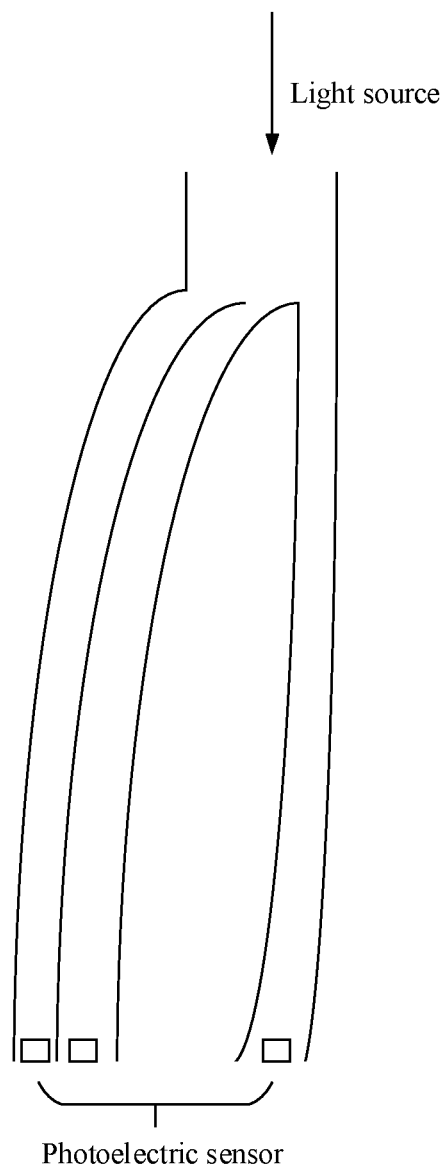
FIG. 3 is a schematic diagram of a structure of another waveguide layer according to an embodiment of this application.

The waveguide layer provided in this embodiment of this application may have a plurality of structures while a limitation condition of the macro-bending loss is met. For example, several structures are provided below. FIG. 2 is a schematic diagram of a structure of a waveguide layer according to an embodiment of this application. As shown in FIG. 2, at least two of the plurality of paths have a same input end, and one light source is disposed at the input end for the at least two paths. In the structure of the waveguide layer shown in FIG. 2, if a path A and a path B have a same input end, and a path C, a path D, and a path E have a same input end, one light source is disposed at a common input end for the path A and the path B, and one light source is disposed at a common input end for the path C, the path D, and the path E. Two light sources in total are shown in FIG. 2. It should be noted that in some application scenarios, the input ends of all of the plurality of paths may be different. It should be noted that in different application scenarios, a thickness of each of the plurality of paths is adjustable. For example, in some implementations, intensity of an optical signal at an output end of one or more paths is required to be stronger, and intensity of an optical signal at an output end of one or more paths is required to be weaker. In this case, the thickness of the path may be adjusted to meet different requirements. In addition, it should be noted that in a preferred implementation, the plurality of paths may be in a single-input multiple-output (SIMO) structure. FIG. 3 is a schematic diagram of a structure of another waveguide layer according to an embodiment of this application. As shown in FIG. 3, the plurality of paths are in a SIMO structure, that is, all of the plurality of paths have a same input end. In this SIMO structure, only one light source may be disposed in the haptic sensing device. The structure is simple, and space is saved.

Figure 4A:
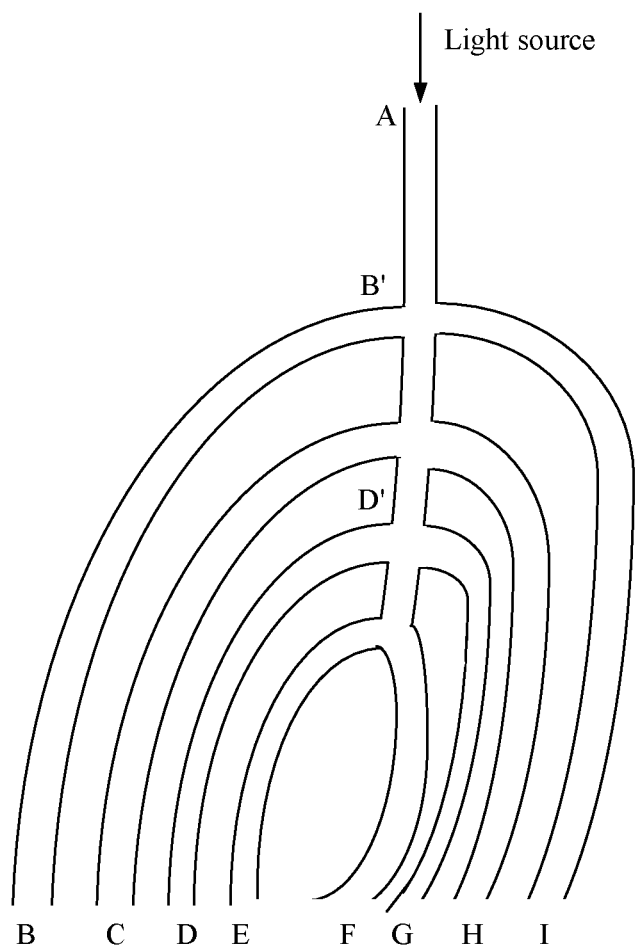
FIG. 4a is a schematic diagram of a structure of another waveguide layer according to an embodiment of this application.
Figure 4B:
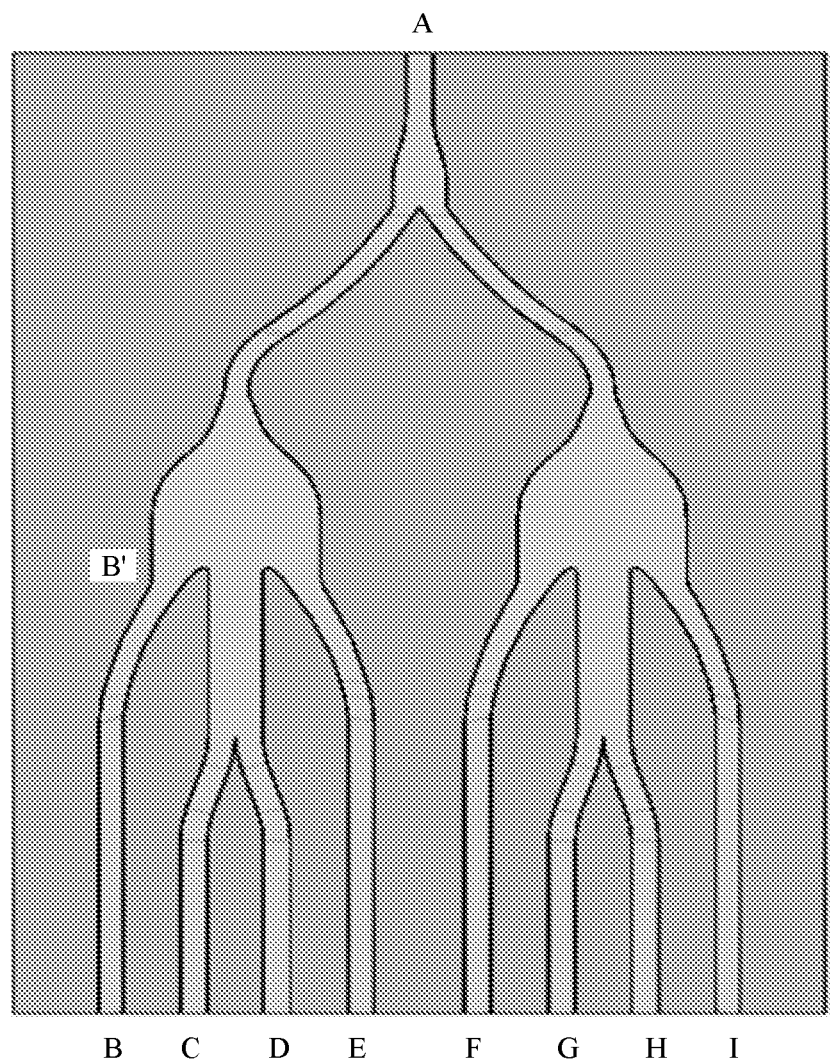
FIG. 4b is a schematic diagram of a structure of another waveguide layer according to an embodiment of this application.
Figure 4C:
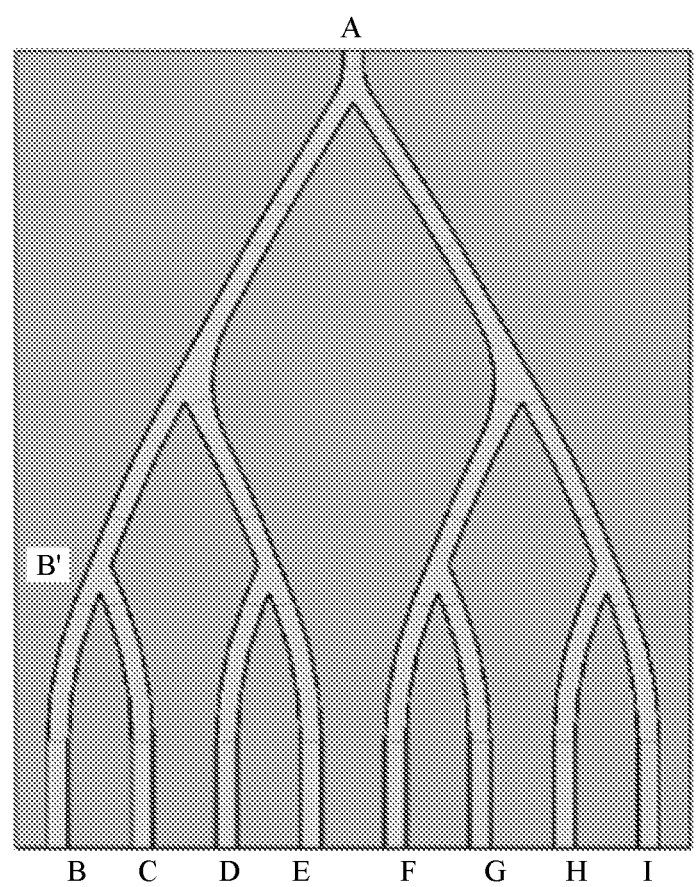
FIG. 4c is a schematic diagram of a structure of another waveguide layer according to an embodiment of this application.
Figure 4D:
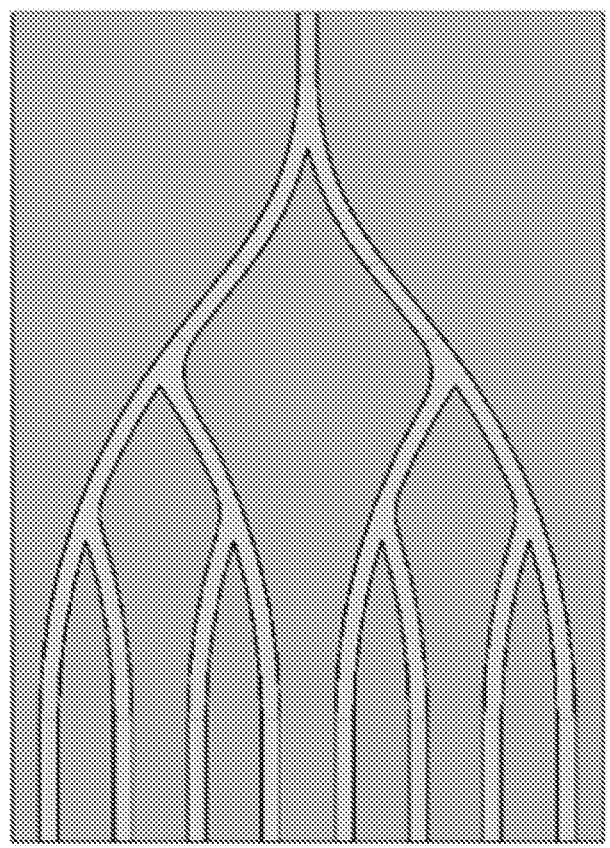
FIG. 4d is a schematic diagram of a structure of another waveguide layer according to an embodiment of this application.
Figure 4E:
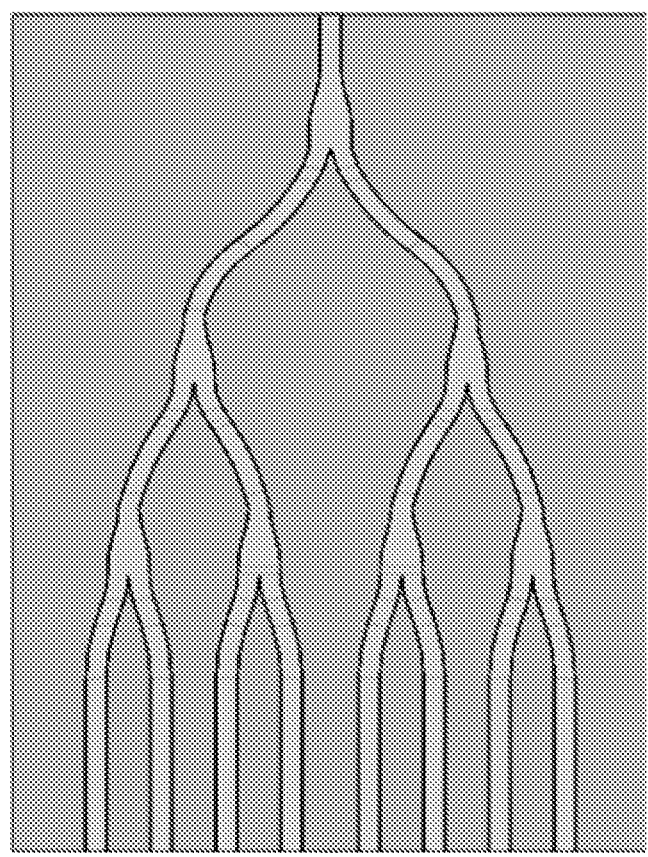
FIG. 4e is a schematic diagram of a structure of another waveguide layer according to an embodiment of this application.

In a more preferred solution, the plurality of paths of the waveguide layer provided in this application may be in a tree-like structure, the input end for the plurality of paths is a root node of the tree-like structure, and the output end of each path is a leaf node of the tree-like structure. A first path includes a trunk part and a branch part, and the first path is any of the plurality of paths. The trunk part is a part that is of the first path and that overlaps a path other than the first path in the plurality of paths, and the branch part is a part that is of the first path and that does not overlap a path other than the first path in the plurality of paths. FIG. 4a is a schematic diagram of a structure of a waveguide layer according to an embodiment of this application. The waveguide layer includes eight paths. It should be noted that the eight paths herein are not intended to limit a quantity, but are merely used as an example for description. A specific quantity of the plurality of paths is not limited in the embodiments of this application. Assuming that an input end for the paths is A and output ends of the paths are respectively B, C, D, E, F, G, H and I, the eight paths are respectively AB, AC, AD, AE, AF, AG, AH and AI. Using the path AB as an example, AB includes a trunk part and a branch part. The trunk part is a part that overlaps a path other than AB in the eight paths. As shown in FIG. 4a, AB includes two segments: AB' and B'B, where AB' overlaps another path. Specifically, for example, it may be considered that there is an overlapping part between AB' and any of the paths AC, AD, AE, AF, AG, AH, and AI. Therefore, AB' is the trunk part of the path AB, and B'B is the branch part of the path AB. It should be noted that in this application, a trunk part of a path and a branch part of a path are specified to define a distribution location of a contact on the housing. To ensure, as far as possible, that there is no interference between light intensity at the input ends of all the paths, for example, a contact corresponding to the path AB should be disposed on the housing above BB' instead of being disposed on the housing above AB'. When the contact corresponding to AB is pressed, it is ensured that light intensity of an optical signal received at the output end of only the path AB changes, and an optical signal received at an output end of another path does not change by the contact corresponding to the path AB being pressed. The path AD is further used as an example to describe a trunk part and a branch part of a path. The path AD may be considered as two parts: AD' and DD', where AD' overlaps another path. Specifically, for example, it may be considered that there are most overlapping parts between AD' and any of the paths AE, AF, and AG, and that there is no overlapping part between DD' and any other path. Therefore, AD' is the trunk part of the path AD, and DD' is the branch part of the path AD. Through the tree-like design shown in FIG. 4a, a layout of contacts is also more compact. In addition to the tree-like structure shown in FIG. 4a, there may be another type of tree-like structure. For example, FIG. 4b is a schematic diagram of a structure of another waveguide layer or a schematic diagram of a structure of another transmission channel. As shown in FIG. 4b, assuming that an input end for paths is A, and output ends of the paths are respectively B, C, D, E, F, G, H and I, eight paths are respectively AB, AC, AD, AE, AF, AG, AH and AI. Using the path AB as an example, AB includes a trunk part and a branch part. The trunk part is a part that overlaps a path other than AB in the eight paths. As shown in FIG. 4b. AB includes two segments: AB' and B'B, where AB' overlaps another path. Specifically, for example, it may be considered that there is an overlapping part between AB' and any of the paths AC, AD, and AE. Therefore, AB' is a trunk part of the path AB, and BB' is a branch part of the path AB. Alternatively, the waveguide layer may be in a structure as shown in FIG. 4c. AB includes two segments: AB' and B'B, where AB' is the trunk part of the path AB, and BB' is the branch part of the path AB. Both a thickness and a bending degree of each of the plurality of paths may be adjusted based on an actual application scenario. FIG. 4d and FIG. 4e are schematic diagrams of structures in which a path structure and a bending degree and a thickness of a path are different from those shown in FIG. 4c. A bending degree of a path is related to a macro-bending loss, and a thickness of the path is related to a light transmission capability of the path. In an actual application scenario, the bending degree and the thickness of the path may be designed with reference to different requirements.

A plurality of contacts are distributed on the housing, and each contact includes at least two forms. When the contact is in a first form, the contact is not in contact with the path. When the contact is in a second form, the contact is in contact with one path, and any two contacts are in contact with different paths when the two contacts both are in the second form. A form of the contact is related to a pressure degree of contact force. The contact provided in this application may be pressed. The first form may be a state in which the contact is not pressed, that is, a form of the contact when there is no contact force on the contact. The second form may be a state in which the contact is pressed. When the contact is pressed, a path below the contact is deformed accordingly under action of the contact. The "below" herein is a direction in which the contact is deformed or a direction in which contact force acts. Larger contact force indicates a larger deformation degree of the path below the contact.

Figure 5:
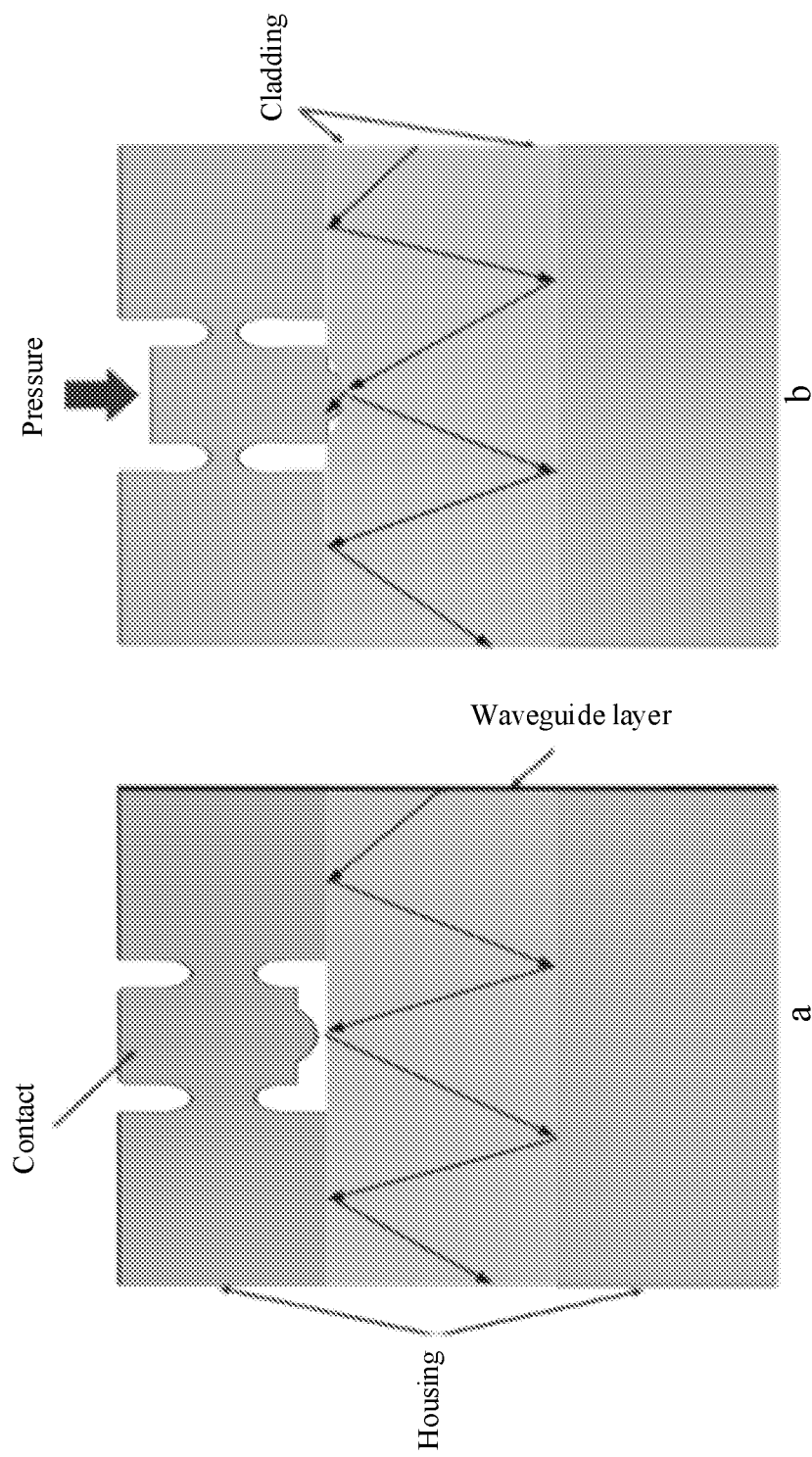
FIG. 5 is a schematic diagram of structures of two forms of a contact in a haptic sensor according to this application.

In a specific implementation, the housing is the cladding. To be specific, in this implementation, a manufacturing process is further simplified, a thickness of the housing of the haptic sensor is decreased, a function of the cladding of the optical waveguide is integrated into the housing of the haptic sensor, so that a structure is simplified, and space is saved. FIG. 5 is a schematic diagram of structures of two forms of a contact in a haptic sensor according to this application. As shown in FIG. 5, in the structures, the cladding structure of the optical waveguide is replaced by the housing, that is, in the structures, the housing encloses the waveguide layer of the optical waveguide, a in FIG. 5 is a schematic diagram in which a contact is in a first form. When the contact is in the first form, there is no contact force on the contact, and the contact is not in contact with the path in the waveguide layer, b in FIG. 5 is a schematic diagram in which a contact is in a second form. When the contact is in the second form, there is contact force on the contact. Under action of the contact force, the contact moves in a direction of a path, and is directly in contact with the path. The path is deformed under action of the contact, and a condition for total internal reflection of the path is damaged. In this application, the contact force is sometimes referred to as pressure or positive pressure. When a difference between the three names is not emphasized, the three names indicate a same meaning. Details are not described below. It should be noted that as a degree of pressure received by the contact becomes larger, deformation of the path under action of the contact also becomes larger. In a specific implementation, the refractive index of the housing may range from 1.35 to 1.38. In a specific implementation, a material of the housing may be a PTFE material.

Figure 6:
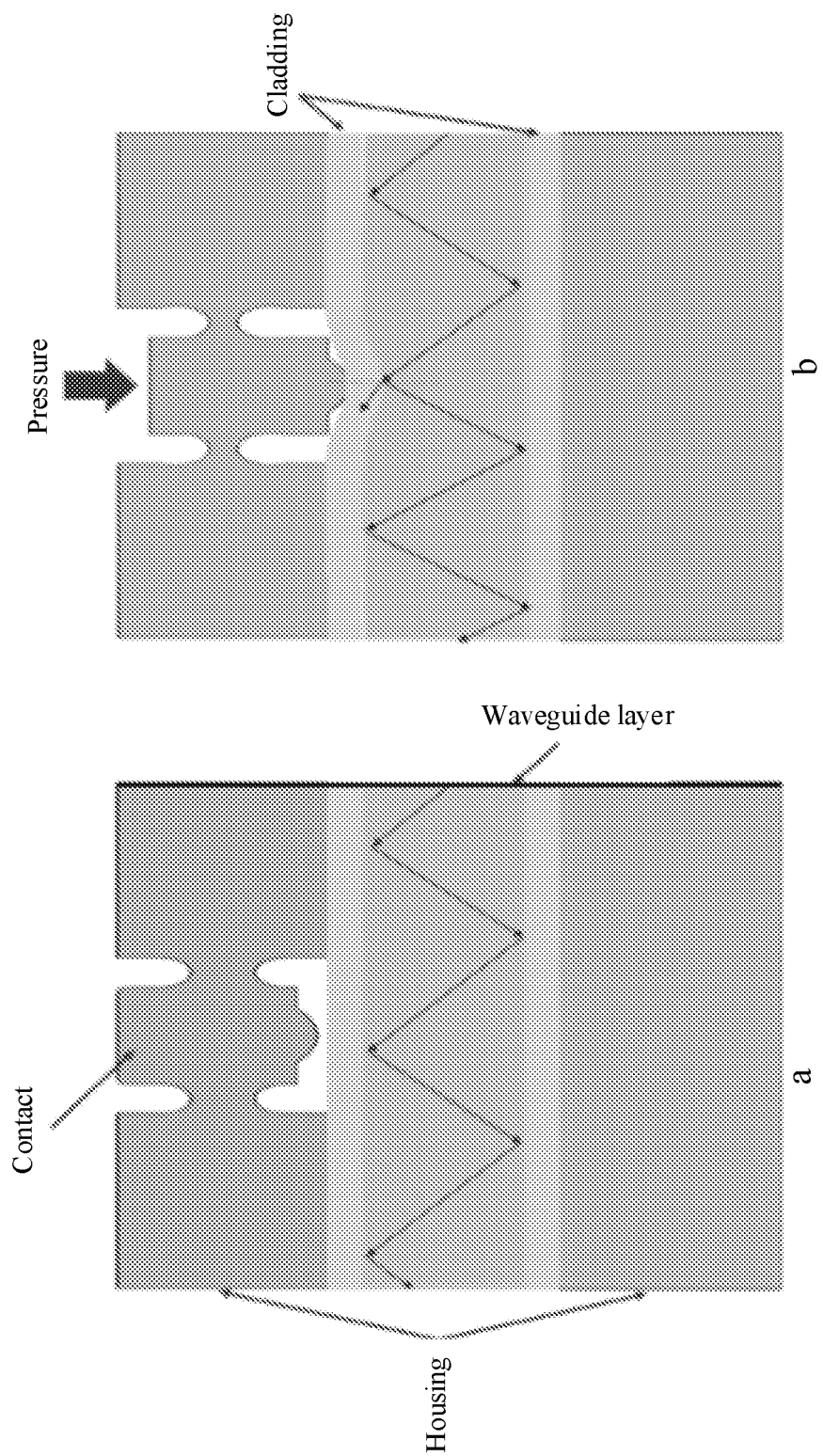
FIG. 6 is a schematic diagram of structures of two forms of a contact in a haptic sensor according to this application.

In a specific implementation, when the housing and the cladding are different structures and the contact is in the second form, the contact is indirectly contacted with one path by using the cladding. When the housing and the cladding are different structures, that is, the cladding encloses the waveguide layer, a structure in which the cladding encloses the waveguide layer is accommodated in the housing. For the haptic sensor, it may be considered that the haptic sensor separately includes the housing, the cladding, and the waveguide layer from the outside to the inside. FIG. 6 is a schematic diagram of structures of two forms of a contact in a haptic sensor according to this application, a in FIG. 6 is a schematic diagram in which a contact is in a first form. When the contact is in the first form, there is no contact force on the contact, and the contact is not in contact with the path in the waveguide layer, b in FIG. 6 is a schematic diagram in which a contact is in a second form. When the contact is in the second form, there is contact force on the contact. Under action of the contact force, the contact moves in a direction of a path, and is indirectly in contact with the path, that is, the contact is indirectly in contact with the path by using the cladding. As a result, the path is deformed under action of the contact, and a condition for total internal reflection of the path is damaged. It should be noted that as a degree of pressure received by the contact becomes larger, deformation of the path under action of the contact also becomes larger.

The contact provided in this application has a plurality of forms, including a non-hollow form and a hollow form. A non-hollow elastic contact can form a good sealing environment, and is not only waterproof and dust-proof, but also not susceptible to an external light source. In addition, a hollow elastic contact is easy to be processed through laser cutting, requires low processing precision, low production costs, and has high production efficiency, which is especially suitable for industrial batch production. Mover, another opaque flexible material is filled into a hollow place, so that a product can have a specific waterproof capability, a specific dust-proof capability, and a specific capability of protection against external light pollution. It should be noted that the opaque flexible material is filled into the hollow place, because the haptic sensor provided in this application transmits a change of contact force by using a change of a optical signal, and impact of an external light source needs to be isolated. In addition, it should be noted that the contact in this application is sometimes referred to as an elastic contact, and a name of a device is not limited in the embodiments of this application. Details are not described again. A design criterion of the contact in this application is that the contact has a higher elastic deformation capability than a surrounding material, and is sensitive to pressure in a normal direction along a contour surface of the housing of the haptic sensor. In a specific implementation, a part that is of the contact and that is in contact with the waveguide layer is designed as a specific contour, to meet a linear relationship between pressure and a light intensity loss.

Figure 7A:
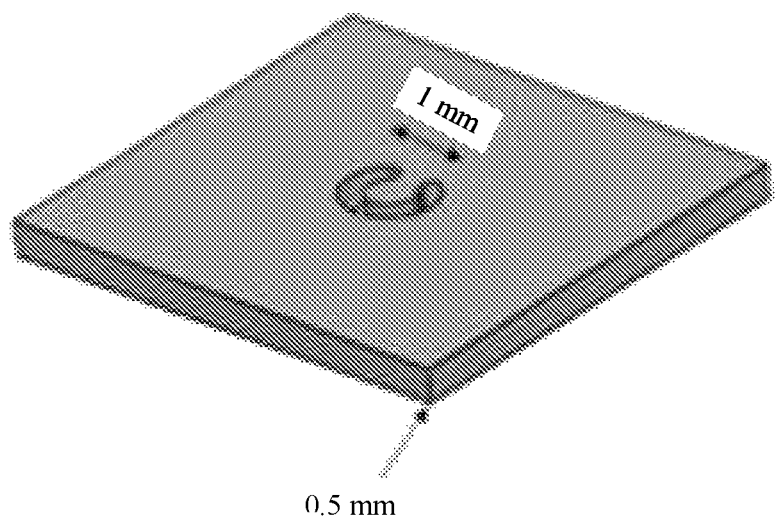
FIG. 7a is a schematic diagram of a structure of a contact according to this application.
Figure 7B:
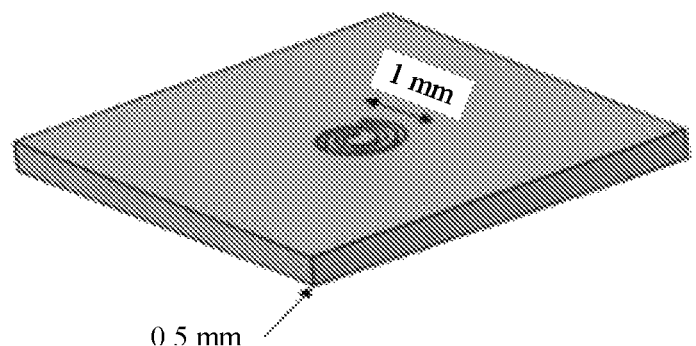
FIG. 7b is a schematic diagram of a structure of another contact according to this application.
Figure 7C:
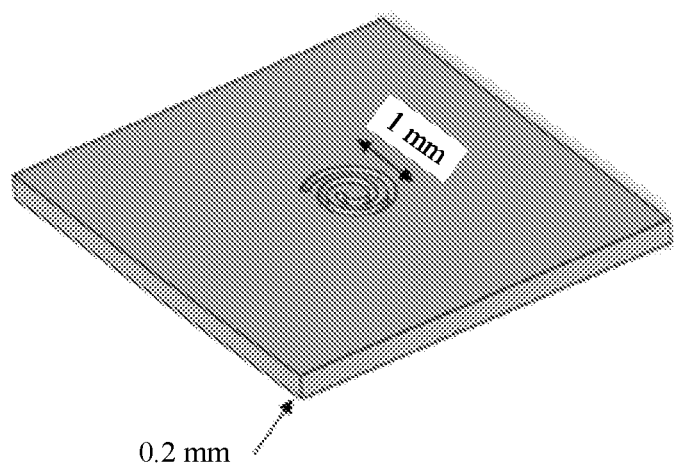
FIG. 7c is a schematic diagram of a structure of another contact according to this application.

The contact provided in this application may have a plurality of shapes. For example, several different shapes of contacts are provided below. FIG. 7a is a schematic diagram of a structure of a contact according to this application. The contact is cantilever-shaped. Specifically, the contact shown in FIG. 7a is hollow. In some embodiments, the cantilever-shaped contact may be non-hollow: As shown in FIG. 7b, the contact is spiral-shaped. Specifically, the contact shown in FIG. 7b is hollow. In some embodiments, the spiral-shaped contact may be non-hollow. It should be noted that the cantilever-shaped contact and the spiral-shaped contact are preferred solutions of a shape of the contact provided in this application. In some specific application scenarios, the contact may be designed as another shape, for example, the contact may be designed as a water drop shape, a rectangle shape, a cross shape, or the like. In addition, it should be noted that a thickness of the contact provided in this application may be the same as a thickness of a housing of a product. When the housing of the product is a thin housing, the solution provided in this application can also be well applied. For example, as shown in FIG. 7a and FIG. 7b, the thickness of the contact is 0.5 mm. As shown in FIG. 7c, the thickness of the contact is 0.2 mm. In this application, it is concluded through a simulated result that the shape of the contact and the thickness of the contact affect performance of the haptic sensor, and specifically, may affect resolution, a service life, and the like of the haptic sensor. Details are separately described below.

In three-dimensional modeling software Solidworks, force analysis is performed on the contacts with different sizes and shapes that are shown in FIG. 7a to FIG. 7c. A setting condition is that pressure applied to each of the three contacts in FIG. 7a to FIG. 7c is 0.4 Mpa. Different materials are selected to separately make the housing. It should be noted that the material of the housing is the same as a material of the contact. Results obtained through simulation are shown in the following Table 1 to Table 3. Table 1 is a force analysis result of the hollow cantilever-shaped contact shown in FIG. 7a. Table 2 is a force analysis result of the hollow spiral-shaped contact whose thickness is 0.5 mm shown in FIG. 7b. Table 3 is a force analysis result of the hollow spiral-shaped contact whose thickness is 0.2 mm shown in FIG. 7c.

TABLE 1

| Material | Elastic modulus (N/mm^2) | Poisson's ratio | Maximum displacement (mm) | Maximum stress (N/mm^2) |
|---|---|---|---|---|
| Stainless steel | 200000 | 0.27 | 2.9e−4 | 1.519e+7 |
| Aluminum alloy | 69000 | 0.33 | 8.1e−4 | 1.551e+7 |
| Nylon | 1000 | 0.30 | 5.5e−2 | 1.535e+7 |
| PTFE | 896 | 0.41 | 6.2e−2 | 1.592e+7 |

As shown in Table 1, four materials: stainless steel, aluminum alloy, nylon, and PTFE, are separately used to make the housing, that is, make a 0.5 mm hollow cantilever-shaped contact. An elastic modulus of a contact made of the stainless steel material is 200000 N/mm^2. In an elastic deformation stage, stress and strain of the material are in a direct proportional relationship (that is, a Hooke's law is met). A proportional coefficient of the direct proportional relationship is referred to as the elastic modulus. An elastic modulus of a contact made of the aluminum alloy is 69000 N/mm^2, an elastic modulus of a contact made of the nylon is 1000 N/mm^2, and an elastic modulus of a contact made of the PTFE is 896 N/mm^2. A Poisson's ratio of the contact made of the stainless steel material is 0.27. A Poisson's ratio is a ratio of an absolute value of lateral positive strain to an absolute value of axial positive strain when the material is pulled or pressed in one direction, and is also referred to as a lateral deformation coefficient, which is an elastic constant reflecting lateral deformation of the material. A Poisson's ratio of the contact made of the aluminum alloy is 0.33, a Poisson's ratio of the contact made of the nylon is 0.30, and a Poisson's ratio of the contact made of the PTFE is 0.41. Maximum displacement of the contact made of the stainless steel material is $2.9e^{-4}$ mm, maximum displacement of the contact made of the aluminum alloy is $8.1e^{-4}$ mm, maximum displacement of the contact made of the nylon is $5.5e^{-2}$ mm, and maximum displacement of the contact made of the PTFE is $6.2e^{-2}$ mm. Maximum stress of the contact made of the stainless steel material is $1.519e^7$ N/m^2, maximum stress of the contact made of the aluminum alloy is $1.551e^7$ N/m^2, maximum stress of the contact made of the nylon is $1.535e^7$ N/m^2, and maximum stress of the contact made of the PTFE is $1.592e^7$ N/m^2.

TABLE 2

| Material | Elastic modulus (N/mm^2) | Poisson's ratio | Maximum displacement (mm) | Maximum stress (N/mm^2) |
|---|---|---|---|---|
| Stainless steel | 200000 | 0.27 | 3.3e−4 | 2.005e+7 |
| Aluminum alloy | 69000 | 0.33 | 9.2e−4 | 2.046e+7 |
| Nylon | 1000 | 0.30 | 6.3e−2 | 2.025e+7 |
| PTFE | 896 | 0.41 | 7.2e−2 | 2.099e+7 |

As shown in Table 2, four materials: stainless steel, aluminum alloy, nylon, and PTFE, are separately used to make the housing, that is, make a 0.5 mm hollow spiral-shaped contact. An elastic modulus of a contact made of the stainless steel material is 200000 N/mm^2, an elastic modulus of a contact made of the aluminum alloy is 69000 N/mm^2, an elastic modulus of a contact made of the nylon is 1000 N/mm^2, and an elastic modulus of a contact made of the PTFE is 896 N/mm^2. A Poisson's ratio of the contact made of the stainless steel material is 0.27. A Poisson's ratio of the contact made of the aluminum alloy is 0.33, a Poisson's ratio of the contact made of the nylon is 0.30, and a Poisson's ratio of the contact made of the PTFE is 0.41. Maximum displacement of the contact made of the stainless steel material is $3.3e^{-4}$ mm, maximum displacement of the contact made of the aluminum alloy is $9.2e^{-4}$ mm, maximum displacement of the contact made of the nylon is $6.3e^{-2}$ mm, and maximum displacement of the contact made of the PTFE is $7.2e^{-2}$ mm. Maximum stress of the contact made of the stainless steel material is $2.005e^7$ N/m^2, maximum stress of the contact made of the aluminum alloy is $2.046e^7$ N/m^2, maximum stress of the contact made of the nylon is $2.025e^7$ N/m^2, and maximum stress of the contact made of the PTFE is $2.099e^7$ N/m^2.

TABLE 3

| Material | Elastic modulus (N/mm^2) | Poisson's ratio | Maximum displacement (mm) | Maximum stress (N/mm^2) |
|---|---|---|---|---|
| Stainless steel | 200000 | 0.27 | 5.1e−3 | 1.160e+8 |
| Aluminum alloy | 69000 | 0.33 | 1.4e−3 | 1.169e+8 |
| Nylon | 1000 | 0.30 | 7.5e−1 | 7.593e+7 |
| PTFE | 896 | 0.41 | 8.7e−1 | 7.481e+7 |

As shown in Table 3, four materials: stainless steel, aluminum alloy, nylon, and PTFE, are separately used to make the housing, that is, make a 0.2 mm hollow spiral-shaped contact. An elastic modulus of a contact made of the stainless steel material is 200000 N/mm^2, an elastic modulus of a contact made of the aluminum alloy is 69000 N/mm^2, an elastic modulus of a contact made of the nylon is 1000 N/mm^2, and an elastic modulus of a contact made of the PTFE is 896 N/mm^2. A Poisson's ratio of the contact made of the stainless steel material is 0.27. A Poisson's ratio of the contact made of the aluminum alloy is 0.33, a Poisson's ratio of the contact made of the nylon is 0.30, and a Poisson's ratio of the contact made of the PTFE is 0.41. Maximum displacement of the contact made of the stainless steel material is $5.3e^{-4}$ mm, maximum displacement of the contact made of the aluminum alloy is $1.4e^{-4}$ mm, maximum displacement of the contact made of the nylon is $7.5e^{-2}$ mm, and maximum displacement of the contact made of the PTFE is $8.7e^{-2}$ mm. Maximum stress of the contact made of the stainless steel material is $1.16e^7$ N/m, maximum stress of the contact made of the aluminum alloy is $1.169e^7$ N/m, maximum stress of the contact made of the nylon is $7.593e^7$ N/m, and maximum stress of the contact made of the PTFE is $7.481e^7$ N/m.

The following conclusions may be obtained from Table 1 to Table 3 by comparing the maximum displacement and the maximum stress between the contacts of different materials and different shapes when same force is applied to the contacts.

1. In a case of a same geometric parameter and same force, the spiral-shaped contact has larger normal displacement. This advantage may improve resolution and a range of the haptic sensor. With Conclusion 1, the spiral-shaped contact provided in this application, that is, the solution in which the spiral-shaped contact is arranged on the housing, may be applied in a situation in which a fine haptic operation is required, for example, may be used on a medical robot. The haptic sensor provided in this application enables the medical robot to have a better effect in terms of haptic sensing, and the medical robot can complete some operations requiring a fine haptic operation. It should be noted that a possible scenario to which the solutions provided in this application may be applied does not indicate a limitation on a scenario to which the solutions provided in this application can be applied, but is merely used as an example for description, so as to facilitate a better understanding of the solutions provided in this application. Details are not described again below:

2. In a case of a same geometric parameter and same force, the cantilever-shaped contact has a smaller stress concentration phenomenon. This advantage may improve a service life of the haptic sensor. With Conclusion 2, the cantilever-shaped contact provided in this application, that is, the solution in which the cantilever-shaped contact is arranged on the housing, may be applied to an electronic product, for example, may be applied to an enclosure of a watch or an earphone. The cantilever-shaped contact is used as a virtual touch key of the electronic product.

3. In a case of a same contact shape and same force, a smaller thickness indicates a more serious stress concentration problem and large normal displacement.

4. Normal displacement and stress concentration are in a non-linear relationship due to impact of various factors, such as a shape of the contact, a geometric parameter, force, and a material property. Conclusion 3 and Conclusion 4 may provide a reference for how to design, based on a requirement in an actual application process, a haptic sensor that meets the requirement.

5. The PTFE is selected as the material of the housing of the haptic sensor not only because the material has a proper refractive index, but also because the material has relatively large normal displacement and a relatively small stress concentration phenomenon when a thickness is 0.2 mm. Through a plurality of experiments in this application, in a preferred solution, the PTFE is selected as the material to make the housing of the haptic sensor, so that precision of the haptic sensor can be better improved.

The housing of the haptic sensor in this application may be an integrally designed thin housing. For example, the thin housing herein may be a housing with a thickness less than 0.5 mm. The housing of the haptic sensor may be designed based on a structural feature of an enclosure of an electronic device, and a part of the enclosure of the electronic device is the housing of the haptic sensor provided in this application. Contacts are distributed in a dot-matrix manner on the housing. In this application, the contacts may be arranged on the enclosure in a manner such as a 3D printing technology, a numerical control machine tool, or a laser cutting and processing.

Figure 8:
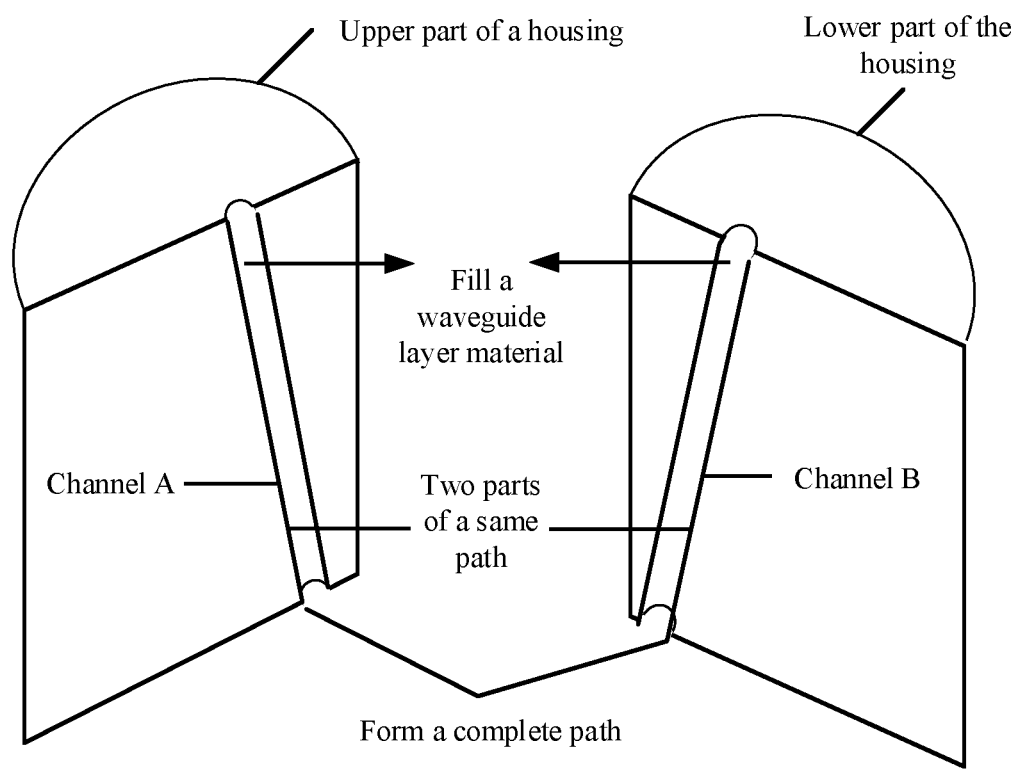
FIG. 8 is a schematic diagram of a structure of a path according to an embodiment of this application.

A structure in which the housing of the haptic sensor is the cladding is used for description. In a specific processing process, the housing of the haptic sensor may be divided into an upper part and a lower part to be respectively processed, and the upper part and the lower part are respectively processed to form distributed channels. For example, based on the paths described in FIG. 2 to FIG. 4e, an upper half of the path and a lower half of the path may be separately formed through processing. FIG. 8 is a schematic diagram of a path according to an embodiment of this application. It is assumed that the housing includes an upper part and a lower part, and distributed channels are separately formed in the upper part and the lower part through processing. As shown in FIG. 8, one path is used as an example. An upper part of the path, namely, a channel A shown in FIG. 8, is formed through processing in the upper part of the housing; and a lower part of the path, namely, a channel B shown in FIG. 8, is formed through processing in the lower part of the housing. An optical waveguide material is filled into the path, and the optical waveguide material coagulates naturally or coagulates through irradiation of ultraviolet light. This design has the following advantage: Although a geometric shape is limited by a macro-bending loss, that is, curvature of each path is limited, there are still countless design manners for a design type, including a shape, a size, and the like, that may be used for a channel in a housing of a sensor. An internal distributed channel has a plurality of forms, which may also reduce a light intensity loss caused by macro-bending. It should be noted that herein, the geometric shape is limited by the macro-bending loss because a curvature radius of each path should be greater than a critical value, and the critical value is determined based on the macro-bending loss. The macro-bending loss means that when the waveguide layer is bent, if the curvature radius is greater than a critical value, an additional optical loss caused by bending is extremely small and even can be ignored. Herein, that the curvature of each path is limited means that the curvature radius is greater than the critical value. The curvature of the path in the solutions provided in this application can still have a plurality of options while this condition is met, and a shape of the path, a thickness of the path, and a diameter of the path all have a plurality of design manners.

The solutions provided in this application may be applied to various products. For example, the technical solutions provided in the embodiments of this application are described below with reference to two specific products.

Figure 9:
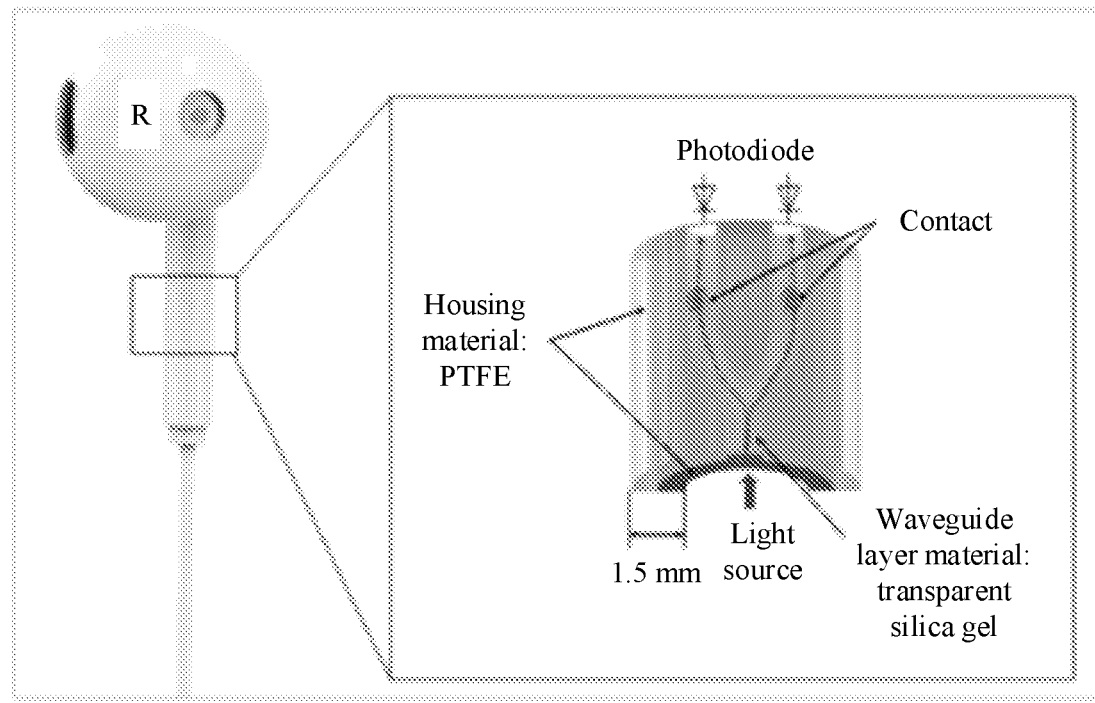
FIG. 9 is a schematic diagram of a structure of an earphone according to an embodiment of this application.

FIG. 9 is a schematic diagram of a structure of an earphone according to an embodiment of this application. As shown in FIG. 9, the earphone includes an enclosure, and a part of the enclosure may be the housing of the haptic sensor described in each of FIG. 1 to FIG. 8. A distribution location of a contact on the enclosure is determined based on a location of a path of a waveguide layer. Specifically, for understanding, refer to the contact described in each of FIG. 1 to FIG. 8 and a location relationship between the contact and each path. Details are not described herein again. In a specific implementation, the enclosure of the earphone may be made of a PTFE material, a material of the waveguide layer may be transparent silica gel, and a thickness of the housing may be set to 1.5 mm. It should be noted that the thickness of the housing herein is a preferred solution. In an actual application scenario, the thickness of the housing may be designed based on a requirement. The solution provided in this application may be applied to a thin-housing scenario. A user may apply contact force to different areas, and control the following functions by using a sequence, a speed, a magnitude, and the like of the applied force: audio play volume, pause/start, fast forward/fast backward, switching between different audio files, an audio play mode (shuffling a playlist, repeating one song and again, repeating in order), and the like. It should be noted that FIG. 9 shows only two paths, and shows only one structure of the path. This is merely intended to help provide description by using an example, and does not indicate a limitation on a quantity of paths and a structure of the path. There may be more design solutions when the haptic sensor provided in this application is arranged on an enclosure of an earphone or another electronic product. The quantity of paths may be set based on an actual application scenario, and the structure of the path may be designed with reference to the above description of the structure of the path in each of FIG. 2 to FIG. 4e. Details are not described again below.

In a specific implementation, the earphone may further include a memory and a processor, the memory is coupled to the processor, and the memory and the processor are disposed inside the enclosure. The memory pre-stores a correspondence between a pressure degree and an instruction, and the processor determines the instruction based on the correspondence and a pressure degree that is of contact force and that is determined by a photoelectric sensor. For example, description is provided below by using an example with reference to Table 4 and Table 5. It is assumed that a contact A is disposed on the enclosure of the earphone. The contact A corresponds to a path A, to be specific, when the contact A is pressed, the path A is deformed accordingly: A photoelectric sensor A is disposed at an output end of the path A. It is assumed that the following is pre-stipulated: If the photoelectric sensor A determines that a pressure degree of contact force is less than first preset pressure, the processor may determine, based on the pressure degree determined by the photoelectric sensor A, that the instruction is "pause". If the photoelectric sensor A determines that the pressure degree of the contact force is not less than the first preset pressure, the processor may determine, based on the pressure degree determined by the photoelectric sensor A, that the instruction is "power off" or "power on". In this case, when there is contact force on the contact A, the photoelectric sensor A may determine whether the contact force is less than the first preset pressure, and the processor may determine, based on a result determined by the photoelectric sensor A, that the instruction is "pause" or "power off/power on". How to determine a pressure degree based on a light intensity loss is specifically described below.

TABLE 4

| Photoelectric sensor detecting a light intensity change | Stress degree | Instruction |
| --- | --- | --- |
| Photoelectric sensor A | Less than the first preset pressure | Pause |
| Photoelectric sensor A | Not less than the first preset pressure | Power off/power on |

It should be noted that in addition to being determined based on the pressure degree, in some possible implementations, the instruction may be determined based on duration in which a light intensity change is detected. Description is provided below with reference to Table 5. It is assumed that a contact A and a contact B are disposed on the enclosure of the earphone. The contact A corresponds to a path A, to be specific, when the contact A is pressed, the path A is deformed accordingly. A photoelectric sensor A is disposed at an output end of the path A. The contact B corresponds to a path B, to be specific, when the contact B is pressed, the path B is deformed accordingly. A photoelectric sensor B is disposed at an output end of the path B. It is assumed that the following is pre-stipulated: If the photoelectric sensor A determines that light intensity loss duration is less than first duration, the processor may determine, based on a result determined by the photoelectric sensor A, that the instruction is "pause". If the photoelectric sensor A determines that the light intensity loss duration is not less than the first duration, the processor may determine, based on a pressure degree determined by the photoelectric sensor A, that the instruction is "power off" or "power on". In this case, when the photoelectric sensor A and the photoelectric sensor B successively detect a light intensity change within second duration, the processor determines, based on a result determined by each of the photoelectric sensor A and the photoelectric sensor B, that the instruction is "increase volume". When the photoelectric sensor B and the photoelectric sensor A successively detect the light intensity change within the second duration, the processor determines, based on a result determined by each of the photoelectric sensor B and the photoelectric sensor A, that the instruction is "decrease volume"

TABLE 5

| Photoelectric sensor detecting a light intensity change | Duration in which the light intensity change is detected | Instruction |
| --- | --- | --- |
| Photoelectric sensor A | Less than the first duration | Pause |
| Photoelectric sensor A | Not less than the first duration | Power off/power on |
| Photoelectric sensor A and | Within the second duration | Increases volume |
| Photoelectric sensor detecting a light intensity change photoelectric sensor B successively detect the light intensity change | Duration in which the light intensity change is detected | Instruction |
| Photoelectric sensor B and photoelectric sensor A successively detect the light intensity change | Within the second duration | Decrease volume |

Figure 10:
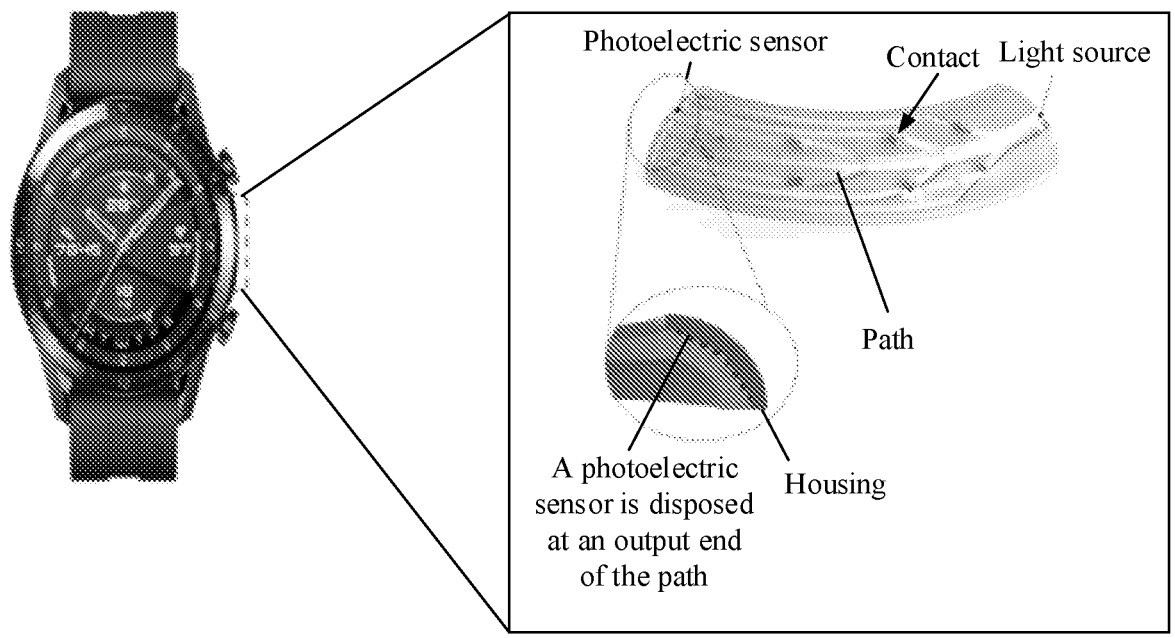
FIG. 10 is a schematic diagram of a structure of a watch according to an embodiment of this application.

FIG. 10 is a schematic diagram of a structure of a watch according to an embodiment of this application. As shown in FIG. 10, the watch includes a watch face and a haptic sensor. A part of the watch face of the watch may be the housing of the haptic sensor described in each of FIG. 1 to FIG. 8. A distribution location of a contact on the enclosure is determined based on a location of a path of a waveguide layer.

Specifically, for understanding, refer to the contact described in each of FIG. 1 to FIG. 8 and a location relationship between the contact and each path. Details are not described herein again. According to the solution provided in this application, a contour surface at an edge of the watch may have a dot-matrix haptic sending capability.

In a specific implementation, the watch may further include a memory and a processor, and the memory is coupled to the processor. The memory pre-stores a correspondence between a pressure degree and an instruction, and the processor determines the instruction based on the correspondence and a pressure degree that is of contact force and that is determined by a photoelectric sensor. A user may apply contact force to different areas, and control a sequence, a speed, and a magnitude, and the like of the applied contact force, to switch between a 12-hour clock and a 24-hour clock, switch a time zone, calibrate a clock, set an alarm, perform timing, and so on.

According to the solution provided in this application, an entity solid key may be replaced with a virtual key, to greatly improve product beauty and efficiency of a precise operation.

The structure of the haptic sensor provided in this application is described above. Specifically, that the haptic sensor may include a light source, an optical waveguide, a photoelectric sensor, and a housing is described, a location relationship and a connection relationship between these components are described, a possible structure of a plurality of paths included in the optical waveguide and a structure of a contact are described. A working principle of the haptic sensor provided in the embodiments of this application is specifically described.

The photoelectric sensor provided in this application obtains, in real time, the optical signal transmitted on the path, and converts the collected optical signal into an electrical signal, where the electrical signal is used to determine a pressure degree of contact force. In a specific implementation, the photoelectric sensor may be a photodiode.

A principle of the haptic sensor provided in this application is described below. As described above, when a bending radius of the optical waveguide becomes small enough, a propagation angle of light is not applicable to a condition for total internal reflection any longer, and a macro-bending loss is generated. In this application, the macro-bending loss and a diameter of a path may be used, so that the haptic sensor provided in this application may be disposed on any three-dimensional small curved surface. A micro-bending loss may be used as a working principle of the haptic sensor in the present invention. To be specific, pressure applied to a contact may cause micro-bending of the optical waveguide, which also damages a condition total internal reflection of light. Therefore, a light intensity loss generated due to micro-bending is observed at an output end of the optical waveguide. Specifically, in this solution, pressure applied to a contact corresponding to a path may cause micro-bending of the path, and a light intensity loss generated due to micro-bending may be observed at an output end of the path by using the photoelectric sensor. A feature of the micro-bending loss determines a range, sensitivity, a dynamic response capability, and the like of the haptic sensor. A micro-bending place is a place in which elastic contact with the outside occurs, that is, a location of the contact. A micro-bending degree determines the range of the sensor, a degree of an optical loss caused by micro-bending determines sensitivity of the sensor, and a recovery speed of micro-bending after the pressure is removed determines the dynamic response capability of the sensor.

Figure 11:
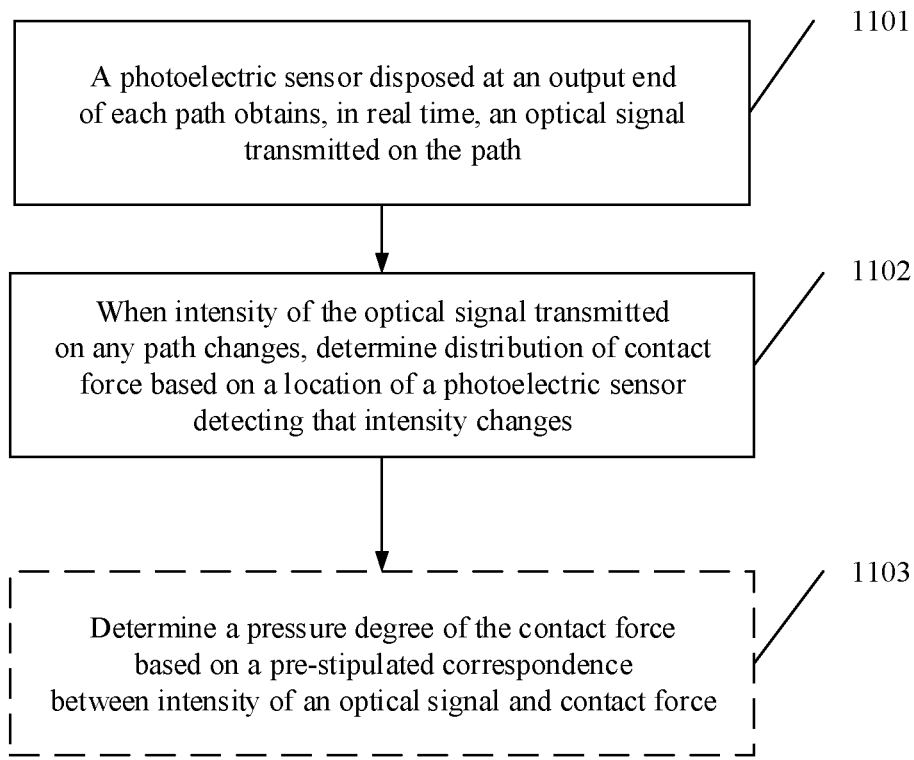
FIG. 11 is a schematic flowchart of a detection method according to an embodiment of this application.

FIG. 11 is a schematic flowchart of a detection method according to an embodiment of this application.

As shown in FIG. 11, the detection method provided in this embodiment of this application may include the following steps.

1101. A photoelectric sensor disposed at an output end of each path obtains, in real time, an optical signal transmitted on the path.

The detection method provided in this application is applied to the haptic sensor described in each of FIG. 1 to FIG. 10. Details of a structure of the haptic sensor are not described herein again.

1102. When intensity of the optical signal transmitted on any path changes, determine distribution of contact force based on a location of a photoelectric sensor detecting that intensity changes.

In other words, when a first photoelectric sensor disposed at an output end of a first path detects that intensity of an optical signal transmitted on the first path changes, it is determined that a contact corresponding to the first path is in a second form, where the first path includes at least one path.

Figure 12:
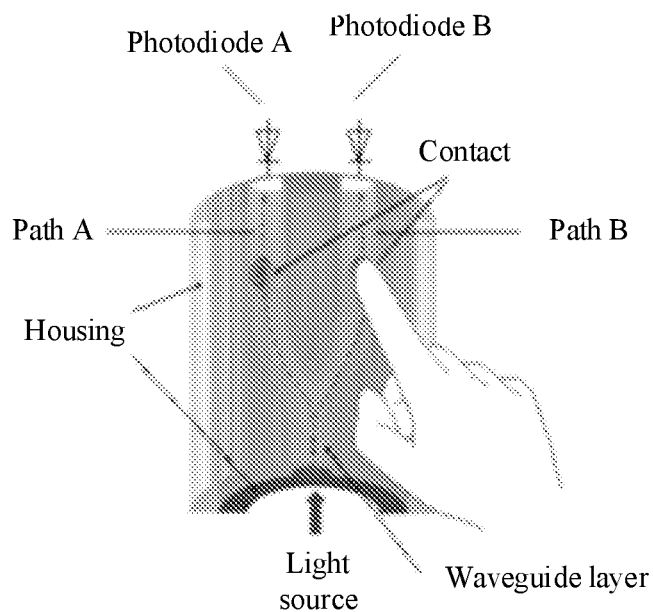
FIG. 12 is a schematic diagram of an application scenario of a detection method according to an embodiment of this application.

FIG. 12 is a schematic diagram of an application scenario of a detection method according to an embodiment of this application. As shown in FIG. 12, that a haptic sensor is disposed on an enclosure of an earphone, as shown in FIG. 9, is used as an example for description. One photoelectric sensor is disposed at an output end of each path. For example, as shown in FIG. 12, a photodiode A is disposed at an output end of a path A, and a photodiode B is disposed at an output end of a path B. As shown in FIG. 12, when a contact corresponding to the path B is pressed, a condition for total internal reflection of the path B is damaged, and an optical signal on the path B has a loss. In other words, the contact corresponding to the path B is deformed, and therefore reflectivity of the path B at a location of the contact changes, which further changes intensity of an optical signal collected by the photodiode B. Therefore, when intensity of the optical signal collected by the B photodiode changes, it may be determined that contact force acts on the contact corresponding to the path B. Similarly, when intensity of an optical signal collected by the photodiode A changes, it may be determined that contact force acts on a contact corresponding to the path A. When both intensity of the optical signal collected by the photodiode A and intensity of the optical signal collected by the photodiode B change, it may be determined that contact force acts on the contact corresponding to the path A and the contact corresponding to the path B.

It may be learned from the embodiment corresponding to FIG. 11 that in some application scenarios, when it is not required to accurately know a pressure degree of contact force or a magnitude of the contact force, the photoelectric sensor disposed at the output end of each path may measure intensity of the optical signal at the output end of the path when a corresponding contact above the path is not pressed; and then determine intensity of the optical signal at the output end of the path when the contact is pressed by contact force. When a difference between the intensity falls within a specific range, it may be determined that the contact corresponding to the path is pressed, that is, it is determined that there is contact force on the contact.

In a specific implementation, the method may further include step 1103 in which a pressure degree of the contact force is determined based on a pre-stipulated correspondence between intensity of an optical signal and contact force.

The haptic sensor provided in this application may determine the pressure degree of the contact force by using a principle that a light intensity loss occurs in a case of micro-bending of the optical waveguide, which is specifically described below: A micro-bending loss may be represented by using the following formula:

$$a_m \propto \frac{A_d L}{4} \left\{ \frac{\sin\left((k'-k_c)\frac{L}{2}\right)}{(k'-k_c)\frac{L}{2}} + \frac{\sin\left((k'+k_c)\frac{L}{2}\right)}{(k'+k_c)\frac{L}{2}} \right\}$$

where $A_d$ is a micro-bending amplitude, L is a micro-bending length, k' is a micro-bending spatial frequency, and $k_c = \Delta\beta = \sqrt{2\Delta}/\alpha$ is a relative refractive index difference of the optical waveguide.

It may be learned from this formula that the micro-bending loss is directly proportional to a product of the micro-bending amplitude and the micro-bending length. Therefore, to obtain a linear relationship between pressure (contact force) and a micro-bending optical loss, when the haptic sensor provided in this application is designed, a contour of a part in which an elastic contact is in contact with an optical waveguide material is fixed to meet or approximately meet the following: As $A_d$ increases, $F \propto m \propto A_d L$.

When it is learned that the pressure (the contact force) is in the linear relationship with the micro-bending optical loss, there may be a plurality of manners of designing the haptic sensor, to determine a pressure degree by using the micro-bending loss. For example, a manner is provided below: Light intensity distribution may be predetermined when there is no pressure on each path. Specifically; the photoelectric sensor disposed at the output end of each path may measure intensity of the optical signal at the output end of the path when a corresponding contact above the path is not pressed; and then determine intensity of the optical signal at the output end of the path when the contact is pressed by contact force. An optical loss is determined by using an intensity change of a optical signal received by the photoelectric sensor, and a magnitude of contact force is determined based on the optical loss. One path is used as an example for description. It is assumed that when a corresponding contact above the path is not pressed, intensity that is of an optical signal and that is determined by the photoelectric sensor at the output end of the path is first intensity, and that when the corresponding contact above the path is pressed, intensity that is of the optical signal and that is determined by the photoelectric sensor at the output end of the path is second intensity. In this case, a loss of the optical signal may be determined based on a difference between the first intensity and the second intensity, and a magnitude of pressure may be determined based on the predetermined linear relationship between pressure and a micro-bending optical loss.

When the linear relationship between a micro-bending loss and pressure is used to determine a magnitude of pressure, it is required to pre-learn of intensity of the optical signal received by the photoelectric sensor disposed at the output end when the contact corresponding to each path is not pressed. It should be noted that it may be preset that when none of the contacts corresponding to all the paths is pressed, the optical signals detected by the photoelectric sensors disposed at the output ends of all the paths have consistent distribution. Alternatively, based on an actual requirement, it may be preset that when none of the contacts corresponding to all the paths is pressed, the optical signals detected by the photoelectric sensors disposed at the output ends of all the paths have inconsistent distribution. An example in which it is preset that when none of the contacts corresponding to all the paths is pressed, the optical signals detected by the photoelectric sensors disposed at the output ends of all the paths have consistent distribution is used for description.

A macro-bending loss may be represented by using the following formula:

$$\alpha_c = \frac{1}{2} \frac{\sqrt{\pi} U^2}{e_v W^{3/2} \sqrt{aR} V^2 k_{v-1}(W) k_{V+1}(W)} \exp\left(-\frac{2}{3} \frac{W^2}{a^2\beta^2} \frac{R}{a}\right),$$

where $$U = \sqrt{k^2 n_1^2 - \beta^2}, W = \sqrt{\beta^2 - k^2 n_2^2}, \text{ and } V = \sqrt{n_1^2 - n_2^2} ka;$$

$n_1$ represents a refractive index of the waveguide layer, $n_2$ is a refractive index of the cladding (it should be noted that when the housing replaces a structure of the cladding, $n_2$ is a refractive index of the housing), $$k = \frac{2\pi}{\lambda}$$

is a macro-bending spatial frequency, R is a curvature radius of path bending, a is a radius of a path, $\beta$ is a transmission constant, that $e_v=2$ corresponds to a fundamental mode, that $e_v=1$ corresponds to a high order mode, $k_v$ is a modified Bessel function, and $\lambda$ represents a wavelength of light.

Figure 13:
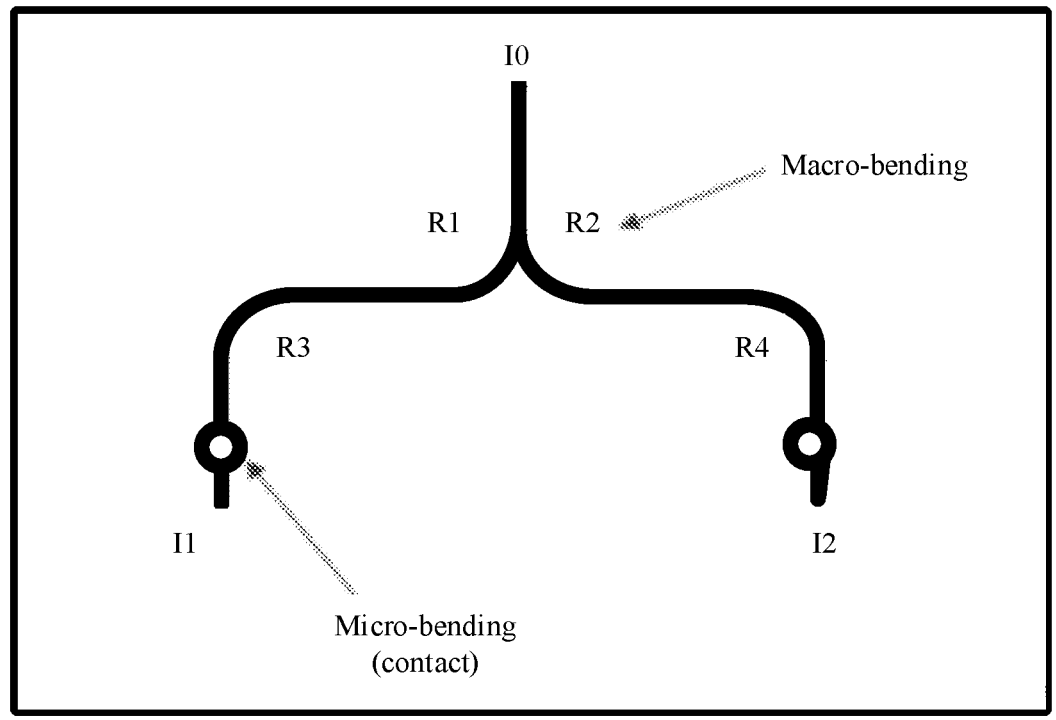
FIG. 13 is a schematic diagram of a principle of a haptic sensor according to an embodiment of this application.

FIG. 13 is a schematic diagram of a principle of a haptic sensor according to an embodiment of this application. As shown in FIG. 13, based on a principle of conservation of energy, in an ideal case, energy $I_0$ emitted from a light source is the sum of injection loss energy $I_{in}$, macro-bending loss energy $I_{loss}(i)$ of each branch, micro-bending loss energy $a_m(i)$ of each elastic contact, and energy $I_r(i)$ received by each photodiode. The injection loss energy $I_{in}$ is a general term of an "absorption loss" and a "scattering loss". The "absorption loss" is a fiber loss caused by an impurity introduced because a material is impure and a process is imperfect. The "scattering loss" is a loss caused by scattering of light because some unevenness is far less than a wavelength. Therefore, the energy emitted by the light source may be represented by using the following formula:

$$I_0 = I_n + \sum_{i=1}^{2} (I_r(i) + I_{loss}(i) + a_m(i)),$$

where $I_{loss}(1) = a_c(R1) + a_c(R3)$, and $I_{loss}(2) = a_c(R2) + a_c(R4)$, where $a_c(R1)$ represents a macro-bending loss at R1, $a_c(R3)$ represents a macro-bending loss at R3, $a_c(R2)$ represents a macro-bending loss at R2, and $a_c(R4)$ represents a macro-bending loss at R4.

To implement even distribution of light intensity between branches when there is no contact force, the following needs to be met:

$$I_{loss}(i)=I_{loss}(j), i\neq j$$

As shown in FIG. 13, two paths are used as examples to describe how to enable the optical signals detected by the photoelectric sensors disposed at the output ends of all the paths to have consistent distribution when none of the contacts corresponding to all the paths is pressed. It should be noted that this principle may be extended to a case in which more branches exist in a haptic device.

In a specific implementation, a pressure degree of positive pressure (and a corresponding elastic deformed amount) may be quantified and rated to achieve a function of a longitudinal multi-layer virtual key.

Figure 14:
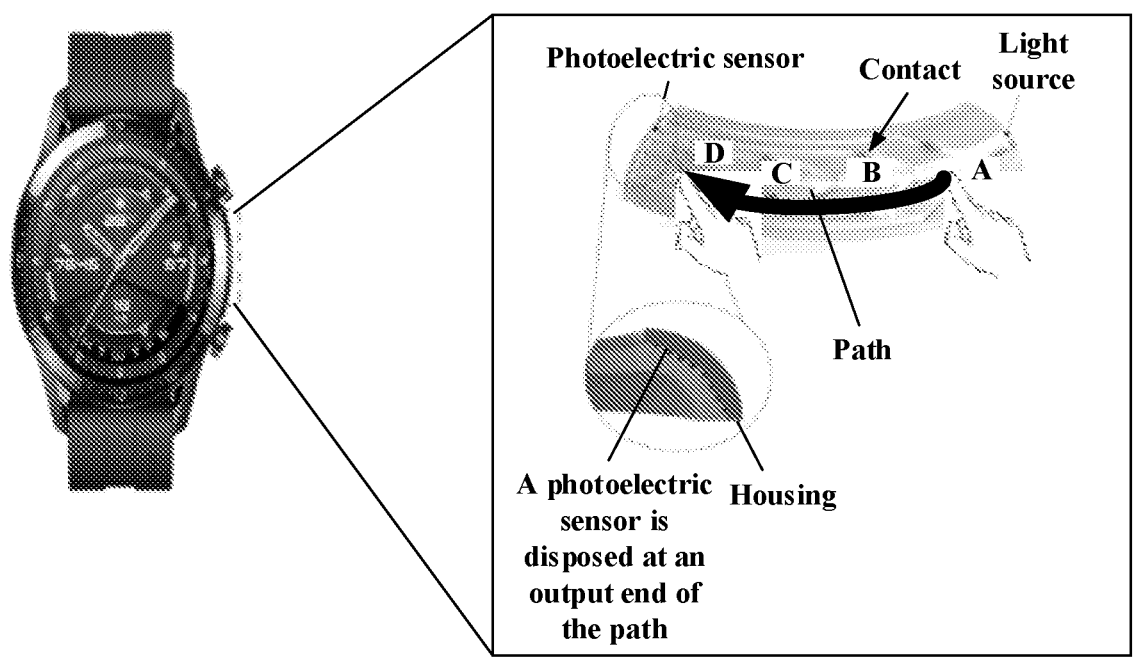
FIG. 14 is a schematic diagram of an application scenario of a detection method according to an embodiment of this application.

In a specific implementation, the determining, when intensity of the optical signal transmitted on any path changes, distribution of contact force based on a location of a photoelectric sensor detecting that intensity changes includes: when optical signals transmitted on at least two neighboring paths in the paths successively change, where the two neighboring paths include a first path and a second path, determining that the contact force slides in a direction from the first path to the second path or that the contact force slides in a direction from the second path to the first path. In other words, the solution provided in this application may be used to continuously obtain a pressure change rule, to detect a sliding track of a finger. FIG. 14 is a schematic diagram of an application scenario of a detection method according to an embodiment of this application. As shown in FIG. 14, that a haptic sensor is disposed on a watch face of a watch, as shown in FIG. 10, is used as an example for description. Assuming that a finger slides from a contact A to a contact D through a contact B and a contact C, the four contacts corresponding to four paths, namely, the contact A, the contact B, the contact C, and the contact D, are successively deformed. It is assumed that a path corresponding to the contact A is a path A, and a photodiode disposed at an output end of the path A is a photodiode A; a path corresponding to the contact B is a path B. and a photodiode disposed at an output end of the path B is a photodiode B; a path corresponding to the contact C is a path C, and a photodiode disposed at an output end of the path C is a photodiode C; and a path corresponding to the contact D is a path D, and a photodiode disposed at an output end of the path D is a photodiode D. In this case, the photodiode A, the photodiode B, the photodiode C, and the photodiode D successively detect a change of light intensity. The solution provided in this application may be used to continuously obtain a pressure change rule, to detect a sliding track of a finger.

This application further provides an electronic device. The electronic device includes an enclosure and a haptic sensor, the haptic sensor is the haptic sensor described in each of FIG. 2 to FIG. 11, and the enclosure includes the housing. The electronic device provided in this application may be any device for which the haptic sensor needs to be configured, such as a mobile phone, a watch, an earphone, a computer, or a smart household.

Figure 15:
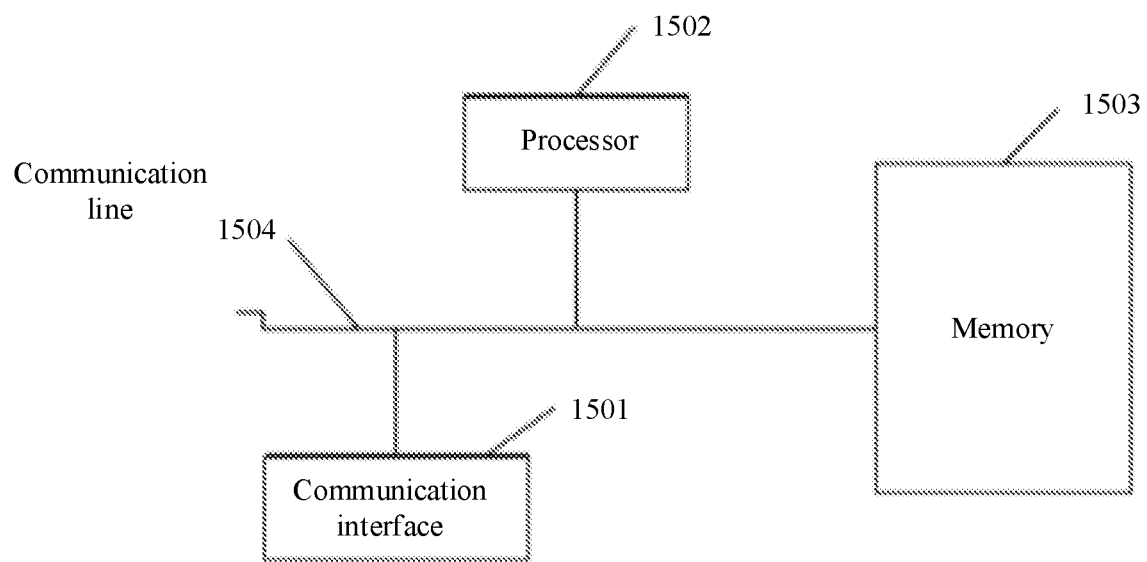
FIG. 15 is a schematic diagram of a hardware structure of a communication device according to an embodiment of this application.

For example, the electronic device provided in this application may be implemented by using a communication device in FIG. 15. FIG. 15 is a schematic diagram of a hardware structure of a communication device according to an embodiment of this application. The communication device includes a communication interface 1501 and a processor 1502, and may further include a memory 1503.

The communication interface 1501 is configured to communicate with another device or communication network by using any apparatus such as a transceiver.

The processor 1502 includes but is not limited to one or more of a central processing unit (CPU), a network processor (NP), an application-specific integrated circuit (application-specific integrated circuit. ASIC), or a programmable logic device (PLD). The PLD may be a complex programmable logic device (CPLD), a field-programmable logic gate array (FPGA), generic array logic (GAL), or any combination thereof. The processor 1502 is responsible for a communication line 1504 and general processing, and may further provide various functions, including timing, peripheral interfacing, voltage regulation, power management, and another control function. The memory 1503 may be configured to store data used by the processor 1502 when the processor 1502 performs an operation.

The memory 1503 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, this is not limited thereto. The memory may exist independently, and is connected to the processor 1502 through the communication line 1504. The memory 1503 may be integrated with the processor 1502. If the memory 1503 and the processor 1502 are mutually independent components, the memory 1503 is connected to the processor 1502. For example, the memory 1503 and the processor 1502 may communicate with each other through the communication line. The communication interface 1501 and the processor 1502 may communicate with each other through a communication line, or the communication interface 1501 may be directly connected to the processor 1502.

The communication line 1504 may include any quantity of interconnected buses and bridges, and the communication line 1504 links together various circuits including one or more processors 1502 represented by the processor 1502 and a memory represented by the memory 1503. The communication line 1504 may further link various other circuits such as a peripheral device, a voltage stabilizer, and a power management circuit. These are well known in the art, and therefore are not further described in this specification.

In a specific implementation, the electronic device may further include a memory and a processor, and the memory is coupled to the processor. The memory pre-stores a correspondence between a pressure degree and an instruction, and the processor determines the instruction based on the correspondence and a pressure degree that is of contact force and that is determined by a photoelectric sensor.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, a compact disc, or the like.

The foregoing descriptions are only optional embodiments of this application, but are not intended to limit this application. Any modification, equivalent replacement, improvement, or the like made without departing from the principle of this application shall fall within the protection scope of this application.

What is claimed is:

1. A haptic sensing device, comprising a light source, an optical waveguide, a plurality of photoelectric sensors, and a housing, wherein
the optical waveguide comprises a waveguide layer and a cladding, the cladding encloses the waveguide layer, and a refractive index of the waveguide layer is greater than a refractive index of the cladding: the waveguide layer comprises a plurality of paths, the light source is disposed at an input end of the plurality of paths, at least one of the plurality of photoelectric sensors is disposed at an output end of each path, and an optical signal emitted by the light source is transmitted to each photoelectric sensor using the plurality of paths;
the light source, the optical waveguide, and the photoelectric sensor are accommodated in the housing;
a plurality of contacts are distributed on the housing, and each contact comprises at least two positions;
for each contact;
when the contact is in a first position, the contact is not in contact with any path;
when the contact is in a second position, the contact is in contact with one of the plurality of paths, and any two contacts are in contact with different paths when the two contacts both are in the second position;
when there is no contact force on the contact, the contact is in the first position; and
when there is contact force on the contact, the contact is in the second position, wherein the optical signal received by the photoelectric sensor is based on the contact being in the first or second position.

2. The haptic sensing device according to claim 1, wherein at least two of the plurality of paths have a same input end, and the light source is disposed at the input end for the at least two paths.

3. The haptic sensing device according to claim 2, wherein the plurality of paths are in a single-input multiple-output (SIMO) structure, and the light source is disposed at an input end for the plurality of paths.

4. The haptic sensing device according to claim 3, wherein the plurality of paths are in a tree-like structure, the input end for the plurality of paths is a root node of the tree-like structure, and the output end of each path is a leaf node of the tree-like structure; a first path comprises a trunk part and a branch part, and the first path is any of the plurality of paths; the trunk part is a part that is of the first path and that overlaps a path other than the first path in the plurality of paths, and the branch part is a part that is of the first path and that does not overlap a path other than the first path in the plurality of paths; and when the contact is in the second form, the contact is in contact with a branch part of one path.

5. The haptic sensing device according to claim 1, wherein a refractive index of the housing ranges from 1.35 to 1.38.

6. The haptic sensing device according to claim 5, wherein a material of the housing is polytetrafluoroethylene (PTFE).

7. The haptic sensing device according to claim 1, wherein when the housing is the cladding and when the contact is in the second position the contact is directly in contact with one path.

8. The haptic sensing device according to claim 1, wherein when the housing and the cladding are different structures and when the contact is in the second position the contact is indirectly in contact with one path by using the cladding.

9. The haptic sensing device according to claim 1, wherein a contour of the contact is fixed.

10. The haptic sensing device according to claim 9, wherein the contact is hollow or non-hollow with an opaque flexible material within the contact.

11. The haptic sensing device according to claim 9, wherein a shape of the contact comprises one or more of a cantilever shape, a spiral shape, or a cross shape.

12. The haptic sensing device according to claim 1, wherein a thickness of the contact is not greater than 0.5 mm.

13. The haptic sensing device according to claim 1, wherein an angle of incidence of the optical signal is 0°.

14. The haptic sensing device according to claim 1 wherein when the contact is in the first position, a deviation between macro-bending losses of any two paths falls within a preset range.

15. The haptic sensing device according to claim 1, wherein curvature of the paths is positively related to a diameter of the paths.

16. An electronic device, wherein the electronic device comprises an enclosure and a haptic sensing device, the haptic sensing device is the haptic sensing device described in claim 1, and the enclosure comprises the housing.

17. The electronic device according to claim 16, wherein the electronic device further comprises a memory and a processor, the memory is coupled to the processor, the memory pre-stores a correspondence between a pressure degree and an instruction, and the processor determines the instruction based on the correspondence and the pressure degree that is of the contact force and that is determined by the photoelectric sensor.

18. A detection method, wherein the detection method is applied to a haptic sensing device, comprising a light source, an optical waveguide, a plurality of photoelectric sensors, and a housing, wherein
the optical waveguide comprises a waveguide layer and a cladding, the cladding encloses the waveguide layer, and a refractive index of the waveguide layer is greater than a refractive index of the cladding; the waveguide layer comprises a plurality of paths, the light source is disposed at an input end of the plurality of paths, at least one of the plurality of photoelectric sensors is disposed at an output end of each path, and an optical signal emitted by the light source is transmitted to each photoelectric sensor using the plurality of paths;
the light source, the optical waveguide, and the photoelectric sensor are accommodated in the housing;
a plurality of contacts are distributed on the housing, and each contact comprises at least two positions;
for each contact:
when the contact is in a first position, the contact is not in contact with any path;
when the contact is in a second position, the contact is in contact with one of the plurality of paths, and any two contacts are in contact with different paths when the two contacts both are in the second position;
when there is no contact force on the contact, the contact is in the first position; and
when there is contact force on the contact, the contact is in the second position, wherein the optical signal received by the photoelectric sensor is based on the contact being in the first or second position;

the detection method comprises:

obtaining, by using at least one of the plurality of photoelectric sensors disposed at an output end of each path, an optical signal transmitted on the path, wherein intensity of the optical signal obtained by the photoelectric sensor is related to a pressure degree of contact force; and determining, when a first photoelectric sensor disposed at an output end of a first path detects that intensity of an optical signal transmitted on the first path changes, that a contact corresponding to the first path is in a second form, wherein the at least one of the plurality of photoelectric sensors comprises the first photoelectric sensor, the at least one path comprises the first path.

19. The detection method according to claim 18, wherein the method further comprises:

determining the pressure degree of the contact force based on a pre-stipulated correspondence between intensity of an optical signal and contact force.

20. The detection method according to claim 18, wherein the determining, when a first photoelectric sensor disposed at an output end of a first path detects that intensity of an optical signal transmitted on the first path changes, that a contact corresponding to the first path is in a second form comprises:

when at least two neighboring photoelectric sensors in the photoelectric sensor successively detect that the intensity of the optical signal changes, determining that at least two contacts in the first path are successively in the second form.

* * * * *